US012783217B1

(12) United States Patent
Ramakrishnan et al.

(10) Patent No.: US 12,783,217 B1

(45) Date of Patent: Nov. 3, 2026

(54) SYSTEMS AND METHODS FOR TRANSFORMING MAINFRAME CODE INTO INTEGRATED PROJECT CODE AND DOCUMENTATION

(71) Applicant: THE BANK OF NEW YORK MELLON, New York, NY (US)

(72) Inventors: Senthilkumar Ramakrishnan, New York, NY (US); Leigh-Ann Russell, New York, NY (US); Michael Keslar, New York, NY (US); Karthikeyan Nallathambi, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 19/333,808

(22) Filed: Sep. 19, 2025

Related U.S. Application Data

(60) Provisional application No. 63/856,052, filed on Aug. 1, 2025.

(51) Int. Cl.
*G06F 8/35* (2018.01)
*G06F 8/41* (2018.01)
(Continued)

(52) U.S. Cl.
CPC .................. *G06F 8/35* (2013.01); *G06F 8/76* (2013.01); *G06F 8/427* (2013.01); *G06F 8/73* (2013.01); *G06F 16/332* (2019.01); *H04L 51/02* (2013.01)

(58) Field of Classification Search
CPC ................. G06F 8/35; G06F 8/73; G06F 8/76
See application file for complete search history.

(56) References Cited

U.S. PATENT DOCUMENTS 6,993,720 B1 1/2006 Hanoch
8,510,714 B2 8/2013 King
(Continued)

FOREIGN PATENT DOCUMENTS

WO WO 2014155148 A1 * 10/2014 ............... G06F 8/51
WO WO 2025195667 A1 * 9/2025 ............... G06F 8/10

OTHER PUBLICATIONS

NPL_Colin Diggs et al. "Leveraging LLMs for Legacy Code Modernization: Challenges and Opportunities for LLM-Generated Documentation" pp. 1-13, [Retrieved from Interent on Nov. 12, 2025], <https://arxiv.org/pdf/2411.14971> (Year: 2024).*
(Continued)

*Primary Examiner* — Ziaul A Chowdhury

(74) *Attorney, Agent, or Firm* — Pillsbury Winthrop Shaw Pittman, LLP

(57) ABSTRACT

Techniques for transforming a mainframe-source artifact into integrated project code and corresponding project documentation, including: compiling a mainframe-source artifact (MSA) to generate a compiler-analysis artifact (CAA); generating, from the CAA, an abstract-syntax-tree (CAA-AST); identifying, based on the CAA-AST, a plurality of logical segments of the MSA; for each logical segment: determining a segment descriptor comprising a segment identifier and a segment label; generating a segment-prompt package comprising a segment-documentation prompt and a segment-code prompt; generating, by applying the segment-documentation prompt to a first large-language model (LLM), segment documentation; and generating, by applying the segment-code prompt to a second LLM, segment code; integrating the segment documentation of the plurality of logical segments to form integrated project documentation for the MSA; integrating the segment code of the plurality of logical segments to form integrated project code (Continued)

for the MSA; and presenting, via a user-interface, the integrated project documentation and project code.

18 Claims, 6 Drawing Sheets

(51) Int. Cl.

| | |
|---|---|
| ***G06F 8/73*** | (2018.01) |
| ***G06F 8/76*** | (2018.01) |
| ***G06F 16/332*** | (2025.01) |
| ***H04L 51/02*** | (2022.01) |

(56) References Cited

U.S. PATENT DOCUMENTS

| | | | | |
|---|---|---|---|---|
| 10,133,738 | B2 | 11/2018 | Huang | |
| 10,162,610 | B2 | 12/2018 | Apte et al. | |
| 10,534,604 | B1 * | 1/2020 | Kimball | G06F 8/427 |
| 10,545,733 | B2 | 1/2020 | Sabharwal et al. | |
| 10,846,081 | B2 | 11/2020 | Sigmon | |
| 10,970,277 | B2 | 4/2021 | Zhang et al. | |
| 11,385,882 | B2 | 7/2022 | Pal et al. | |
| 11,467,951 | B2 | 10/2022 | Pillai | |
| 11,487,522 | B1 | 11/2022 | Singh | |
| 11,537,368 | B2 | 12/2022 | Brown | |
| 11,775,271 | B1 | 10/2023 | Singh | |
| 11,875,141 | B2 | 1/2024 | Rathinasamy | |
| 11,899,566 | B1 | 2/2024 | Singh | |
| 11,934,810 | B2 | 3/2024 | Wengier | |
| 12,032,936 | B2 | 7/2024 | Allamanis | |
| 12,061,880 | B2 | 8/2024 | Chen | |
| 12,093,671 | B2 | 9/2024 | Singh | |
| 12,360,791 | B1 * | 7/2025 | Vadaparty | G06F 8/447 |
| 12,511,105 | B2 | 12/2025 | Hensley | |
| 12,541,447 | B2 | 2/2026 | Schumacher | |
| 12,645,716 | B2 | 6/2026 | Mansour | |
| 12,675,390 | B2 | 7/2026 | Sondhi | |
| 2007/0226690 | A1 * | 9/2007 | Sandys | G06F 11/3624 717/124 |
| 2013/0055211 | A1 | 2/2013 | Fosback | |
| 2015/0378880 | A1 | 12/2015 | Kucharski | |
| 2019/0155588 | A1 | 5/2019 | Panchomarthi et al. | |
| 2021/0011694 | A1 | 1/2021 | Ni et al. | |
| 2021/0192385 | A1 | 6/2021 | Guiu et al. | |
| 2021/0286598 | A1 * | 9/2021 | Luo | G06F 8/73 |
| 2021/0311709 | A1 | 10/2021 | Banerjee | |
| 2022/0001968 | A1 | 1/2022 | Garner et al. | |
| 2022/0066747 | A1 | 3/2022 | Drain et al. | |
| 2022/0405189 | A1 | 12/2022 | De Souza | |
| 2023/0040412 | A1 | 2/2023 | Ramsl | |
| 2023/0393832 | A1 | 12/2023 | Touati et al. | |
| 2024/0184555 | A1 | 6/2024 | De Toni | |
| 2024/0346061 | A1 | 10/2024 | Hong | |
| 2024/0403005 | A1 * | 12/2024 | Friddle | G06F 8/35 |
| 2025/0045048 | A1 | 2/2025 | Dey | |
| 2025/0045185 | A1 | 2/2025 | Tang | |
| 2025/0053389 | A1 * | 2/2025 | Jaggumantri | G06F 40/20 |
| 2025/0053397 | A1 | 2/2025 | Lee | |

OTHER PUBLICATIONS

NPL_WO 2014155148 A1_With Page No. & Line Numbers (Year: 2014).*

SYSADATA record types—IBM Documentation, downloaded Jun. 4, 2025, 2 pgs. https://www.ibm.com/docs/en/cobol-zos/6.4.0?topic=contents-sysadata-record-types.

International Search Report dated Nov. 18, 2024, issued in corresponding International Application No. PCT/US2024/040348 (3 pgs.).

Written Opinion of the International Searching Authority dated Nov. 18, 2024, issued in corresponding International Application No. PCT/US2024/040348 (4 pgs.).

Micro Focus, Enterprise Sync. Installation and Administration Guide, pp. 1-54 (2017).

E. Egger, Building Docs like Code: Continuous Integration for Documentation, 34 pages (Year: 2020).

Ghrab et al. LLM-Based Code Documentation Generation and Multi-Judge Evaluation, 7 pages (Year: 2026).

* cited by examiner

Example Compiler-Object Artifact (COA 156) (SYSLIN header)

```
*MODULE   PAYROLL  LENGTH=0003F4   ATTR=AMODE 31 RMODE 24
*TEXT     000000  47F0C001  D207C002  5810C004
*RLD      000010  ENTRY=PAYROLL
*RLD      000018  REF   =PAY-TAX-TBL   OFFSET=00012A
*ENDMOD
```

Example Compiler-Analysis Artifact (CAA 158) (SYSADATA snippet)

```
Rec#  Type    Offs  Length  Payload...
0001  PTR      00   001C    03F22011 0000001C   ; Parse-Tree Header
0002  SRC      1C   0032    000430 "IF TAX-CODE = 'A1' THEN" ...
0003  SYMDEF   4E   0014    0002  PAY-TAX-TBL  PIC 9(5)
0004  XREF     62   000C    0002  000430        ; PAY-TAX-TBL used @ line
430
```

Example CAA-XML 162 (fragment)

```
<Procedure name="CALC-TAX" line="420">
  <If>
    <Condition var="TAX-CODE" line="430" />
    <Then>
      <Move src="RATE-A1" dst="TAX-RATE" />
    </Then>
  </If>
</Procedure>
```

Example CAA-AST 164 (textual tree)

```
PROC: CALC-TAX (ln 420)
└── IF (ln 430)
    ├── VAR: TAX-CODE
    └── THEN
        └── MOVE
            ├── SRC VAR: RATE-A1
            └── DST VAR: TAX-RATE
```

Example Segment Descriptor 166

```
{
  "segmentId": "CH-CALC-TAX",
  "labels": ["Control-Flow Logic", "Relational-Query Operation"],
  "nodeRange": [420, 455],
  "tokenCount": 312
}
```

FIG. 3A

Example Documentation Prompt 174 (Back-End Developer)

```
ROLE: Back-End Developer
SEGMENT: CH-CALC-TAX
SOURCE:
IF TAX-CODE = 'A1' THEN
   MOVE RATE-A1 TO TAX-RATE.
---
Describe: (a) purpose, (b) inputs/outputs,
(c) edge cases, (d) performance notes.
```

Example Code Prompt 176 (Java 17 / Spring Boot)

```
Generate Java 17 code that replicates the logic below.
• Use Spring @Service style.
• Map COBOL fields to BigDecimal.
• Apply naming: calcTax()

COBOL SOURCE:
IF TAX-CODE = 'A1' THEN
   MOVE RATE-A1 TO TAX-RATE.
```

Example Generated Segment Code 180 (Java class excerpt)

```
@Service
public class TaxCalculator {

  public BigDecimal calcTax(String taxCode, BigDecimal rateA1) {
     if ("A1".equals(taxCode)) {
        return rateA1;
     }
     return BigDecimal.ZERO;
  }
}
```

Example Generated Segment Documentation 186 (Markdown)

```
### CALC-TAX Segment (CH-CALC-TAX)

| Field           | Description       |
|-----------------|-------------------|
| **TAX-CODE**    | Employee tax bucket (A1, B1 …) |
| **TAX-RATE**    | Computed payroll tax (%)       |

**Logic summary:**
If the tax code equals **A1** the segment moves the pre-configured
rate `RATE-A1` into `TAX-RATE`. No other branch is evaluated.
```

FIG. 3B

SYSTEMS AND METHODS FOR TRANSFORMING MAINFRAME CODE INTO INTEGRATED PROJECT CODE AND DOCUMENTATION

RELATED APPLICATIONS

This application claims the benefit of and priority to U.S. Provisional Patent Application No. 63/856,052, filed Aug. 1, 2025 and titled "SYSTEMS AND METHODS FOR TRANSFORMING LEGACY MAINFRAME CODE INTO INTEGRATED PROJECT CODE AND DOCUMENTATION", the disclosure of which is incorporated herein by reference in its entirety.

FIELD

Embodiments relate generally to legacy code transformation and, more particularly, to systems and methods for converting source programs developed for computing environments into modern software artifacts, such as integrated source code and documentation.

BACKGROUND

Mainframe computing systems have been widely used for decades in enterprise environments to support critical business operations such as transaction processing, batch computing, financial record-keeping, and customer data management. These systems typically execute programs written in legacy programming languages tailored for mainframe architectures, such as COBOL, PL/I, Job Control Language (JCL), CICS command-level code, and IMS control blocks. Mainframe applications are often large, monolithic, and deeply integrated into enterprise workflows, with production environments that may encompass hundreds of millions of lines of source code.

Modern software development increasingly favors modular, distributed systems built using object-oriented or service-oriented architectures, often implemented in widely adopted programming languages such as Java, Python, or Go. These languages are typically deployed in cloud-native environments, emphasize maintainability and scalability, and are supported by contemporary toolchains for build automation, testing, and documentation. Java in particular is frequently used to implement microservices and is supported by extensive developer ecosystems and frameworks. Many organizations seek to migrate or transform their legacy mainframe applications into modern software stacks to reduce operational costs, improve agility, and ensure long-term maintainability.

SUMMARY

Although mainframe systems continue to support core enterprise functions, transforming these systems into modern, maintainable software environments presents significant technical and operational challenges. Many legacy applications were developed decades ago using languages such as COBOL, JCL, and CICS, and often span millions of lines of tightly coupled, procedural code. Over time, institutional knowledge of these systems has diminished. Organizations now face a growing shortage of subject-matter experts (SMEs) capable of interpreting, modifying, or migrating mainframe code, as the workforce skilled in these technologies continues to retire or shift to other domains. Compounding the problem is a lack of accessible, up-to-date documentation for many legacy applications. In many cases, the original program specifications are incomplete, outdated, or nonexistent. This limits the ability of developers to understand business logic embedded in the code and slows down maintenance and transformation efforts. Conventional modernization techniques—such as manual rewrites, line-by-line code converters, or lift-and-shift rehosting-often fail to deliver the semantic clarity and modularity required for modern application architectures. Moreover, these approaches are typically expensive, time-consuming, and can be dependent on brittle, grammar-based parsers that must be tuned to each legacy environment's idiosyncrasies. Additionally, existing tools generally operate using static analysis alone and lack access to runtime insights that could improve transformation fidelity. They may generate syntactically correct target code, but with poor alignment to actual usage patterns, performance characteristics, or domain-specific business boundaries. Most solutions also treat code generation and documentation as distinct, disconnected processes, leading to gaps in traceability and limiting the maintainability of the resulting system. Moreover, approaches generally do not leverage compiler-generated analysis artifacts—such as SYSADATA files—to produce an abstract syntax tree, segment that tree, and drive coordinated operation of the documentation engine, code-generation engine, chat engine, and code-migration engine described in this disclosure.

Provided are systems and methods for transforming legacy mainframe software artifacts into integrated project code and accompanying documentation using a compiler-guided transformation pipeline. In some instances, rather than relying on text-based parsing of source files, the disclosed system compiles a legacy mainframe-source artifact (MSA) using a mainframe compiler to produce a compiler object artifact (COA) and a compiler analysis artifact (CAA). The CAA provides a fully parsed, compiler-resolved representation of the program—including expanded copybooks, data definitions, symbol references, and control-flow structure—which is converted to machine-readable XML and parsed to form a canonical abstract syntax tree (CAA-AST). A segmentation engine walks the CAA-AST to define logical code segments based on dependency closure, each associated with a segment identifier and a segment label. For each segment, a prompt generation engine produces a segment documentation prompt and a segment code prompt, which are applied to one or more selected large language models (LLMs) to generate structured documentation (by a document-generation engine) and corresponding source code (by a code-generation engine), such as Java classes, interfaces, and data-access components. The outputs are aggregated, deduplicated, and integrated into an executable project code bundle and corresponding documentation package (by a code integration engine and documentation integration engine), after which the deployment artifacts can be produced (by a code-migration engine) for a target runtime. An interface engine (including a chat engine) presents the results in a user-facing environment that supports interactive review, natural-language querying backed by vectorized embeddings of the generated documentation and code, and regeneration of segments in response to feedback.

As described, certain embodiments leverage compiler-derived artifacts and hybrid static-dynamic analysis to produce accurate, modular, and context-aware transformations of legacy mainframe code. By aligning documentation and code generation within the same transformation pipeline, and incorporating role-specific templates, domain models, and retrieval-augmented chat interaction, the system provides an efficient and scalable modernization pathway suitable for large-scale enterprise migration programs—while reducing SME dependency and improving long-term system comprehensibility. Moreover, these techniques offer concrete improvements in computational performance and transformation throughput. For example, by relying on compiler-generated analysis artifacts (e.g., CAA) that encode a fully parsed and symbol-resolved representation of the source program, the system avoids repetitive grammar-based tokenization and redundant parsing operations. Segment-level prompt generation localizes processing to dependency-closed subgraphs of the abstract syntax tree, enabling deterministic prompt construction and reducing resource consumption. Output deduplication during integration further improves efficiency by eliminating redundant code artifacts, while the migration engine automates packaging and deployment, shortening release cycles. Collectively, these features may reduce transformation latency, increase throughput across large codebases, and enhance the responsiveness of interactive feedback workflows—thereby improving the overall performance and scalability of the systems executing the transformation pipeline.

Although certain embodiments are described in the context of transforming COBOL-based mainframe source artifacts into Java-based project code, for the purpose of explanation, the systems and methods described herein may not be limited to any particular source or target programming language. For example, the disclosed techniques may be applied to any suitable legacy source environment—including, but not limited to, PL/I, JCL, or assembler—and may target a variety of modern programming languages or deployment environments, such as Python, C#, Go, or cloud-native frameworks. Accordingly, references to COBOL or Java throughout this disclosure are made for illustrative clarity and are not intended to limit the scope of the claimed. Although certain embodiments are described in the context of a mainframe and a mainframe compiler, the systems and methods described herein may not be limited to mainframe environments. For example, the disclosed techniques may be applied in an environment that employs a compiler that emits structured analysis artifacts—such as parse trees, symbol tables, or cross-reference records.

Provided in some embodiments is a computer-implemented method for transforming a mainframe-source artifact into integrated project code and corresponding project documentation, the method including: compiling, with a mainframe compiler, a mainframe-source artifact (MSA) to generate a compiler-analysis artifact (CAA); generating, from the CAA, an abstract-syntax-tree (CAA-AST); identifying, based on the CAA-AST, a plurality of logical segments of the MSA; for each logical segment: determining a segment descriptor including a segment identifier and a segment label; generating a segment-prompt package including a segment-documentation prompt and a segment-code prompt; generating, by applying the segment-documentation prompt to a first large-language model (LLM), segment documentation; and generating, by applying the segment-code prompt to a second LLM, segment code; integrating the segment documentation of the plurality of logical segments to form integrated project documentation for the MSA; integrating the segment code of the plurality of logical segments to form integrated project code for the MSA; and presenting, via a user-interface engine, the integrated project documentation and the integrated project code.

In some embodiments, the CAA includes a SYSADATA file emitted by the mainframe compiler. In some embodiments, the CAA includes a compiler-generated binary file that encodes a parse-tree representation of the mainframe-source artifact and symbol-table metadata to map each node of the parse tree to a corresponding data definition or procedure element. In some embodiments, the CAA-AST includes a hierarchical graph data structure whose nodes represent compiler-resolved program elements and whose edges encode control-flow and data-reference relationships among those nodes. In some embodiments, identifying the plurality of logical segments includes traversing dependency links in the CAA-AST until a dependency-closure condition is met, thereby ensuring that each logical segment contains every data structure and external operation referenced by that segment. In some embodiments: the segment identifier is a deterministic hash calculated from node identifiers included in the logical segment; and the segment label is selected from a predefined segment-label library that includes at least: Data-Structure Definition, Persistent-Storage Definition, Relational-Query Operation, Transactional-API Call, and Control-Flow Logic. In some embodiments, generating the segment-prompt package further includes deriving at least one of the segment-documentation prompt or the segment-code prompt from a prompt template stored in a template library and selected according to the segment label. In some embodiments, selecting the first LLM includes selecting, from a model library, a model corresponding to a target user role for the documentation, or selecting the second LLM includes selecting, from the model library, a model having a code-generation capability corresponding to a target programming language of the segment code. In some embodiments, the user-interface engine includes: a chat interface operable to receive natural-language queries and regeneration commands; and a viewer operable to display the integrated project documentation and the integrated project code in a coordinated presentation.

Provided in some embodiments is a system including: a processor; and non-transitory computer readable storage medium including program instructions stored thereon that are executable by a processor to cause the following operations for transforming a mainframe-source artifact into integrated project code and corresponding project documentation: compiling, with a mainframe compiler, a mainframe-source artifact (MSA) to generate a compiler-analysis artifact (CAA); generating, from the CAA, an abstract-syntax-tree (CAA-AST); identifying, based on the CAA-AST, a plurality of logical segments of the MSA; for each logical segment: determining a segment descriptor including a segment identifier and a segment label; generating a segment-prompt package including a segment-documentation prompt and a segment-code prompt; generating, by applying the segment-documentation prompt to a first large-language model (LLM), segment documentation; and generating, by applying the segment-code prompt to a second LLM, segment code; integrating the segment documentation of the plurality of logical segments to form integrated project documentation for the MSA; integrating the segment code of the plurality of logical segments to form integrated project code for the MSA; and presenting, via a user-interface engine, the integrated project documentation and the integrated project code.

In some embodiments, the CAA includes a SYSADATA file emitted by the mainframe compiler. In some embodiments, the CAA includes a compiler-generated binary file that encodes a parse-tree representation of the mainframe-source artifact and symbol-table metadata to map each node of the parse tree to a corresponding data definition or procedure element. In some embodiments, the CAA-AST includes a hierarchical graph data structure whose nodes represent compiler-resolved program elements and whose edges encode control-flow and data-reference relationships among those nodes. In some embodiments, where identifying the plurality of logical segments includes traversing dependency links in the CAA-AST until a dependency-closure condition is met, thereby ensuring that each logical segment contains every data structure and external operation referenced by that segment. In some embodiments: the segment identifier is a deterministic hash calculated from node identifiers included in the logical segment; and the segment label is selected from a predefined segment-label library that includes at least: Data-Structure Definition, Persistent-Storage Definition, Relational-Query Operation, Transactional-API Call, and Control-Flow Logic. In some embodiments, where generating the segment-prompt package further includes deriving at least one of the segment-documentation prompt or the segment-code prompt from a prompt template stored in a template library and selected according to the segment label. In some embodiments, selecting the first LLM includes selecting, from a model library, a model corresponding to a target user role for the documentation, or selecting the second LLM includes selecting, from the model library, a model having a code-generation capability corresponding to a target programming language of the segment code. In some embodiments, the user-interface engine includes: a chat interface operable to receive natural-language queries and regeneration commands; and a viewer operable to display the integrated project documentation and the integrated project code in a coordinated presentation.

Provided in some embodiments is non-transitory computer readable storage medium including program instructions stored thereon that are executable by a processor to cause the following operations for transforming a mainframe-source artifact into integrated project code and corresponding project documentation: compiling, with a mainframe compiler, a mainframe-source artifact (MSA) to generate a compiler-analysis artifact (CAA); generating, from the CAA, an abstract-syntax-tree (CAA-AST); identifying, based on the CAA-AST, a plurality of logical segments of the MSA; for each logical segment: determining a segment descriptor including a segment identifier and a segment label; generating a segment-prompt package including a segment-documentation prompt and a segment-code prompt; generating, by applying the segment-documentation prompt to a first large-language model (LLM), segment documentation; and generating, by applying the segment-code prompt to a second LLM, segment code; integrating the segment documentation of the plurality of logical segments to form integrated project documentation for the MSA; integrating the segment code of the plurality of logical segments to form integrated project code for the MSA; and presenting, via a user-interface engine, the integrated project documentation and the integrated project code. In some embodiments, the CAA includes a SYSADATA file emitted by the mainframe compiler.

BRIEF DESCRIPTION OF THE DRAWINGS

FIGS. 3A and 3B are diagrams that illustrate various example elements in accordance with one or more embodiments.

Figure 1:
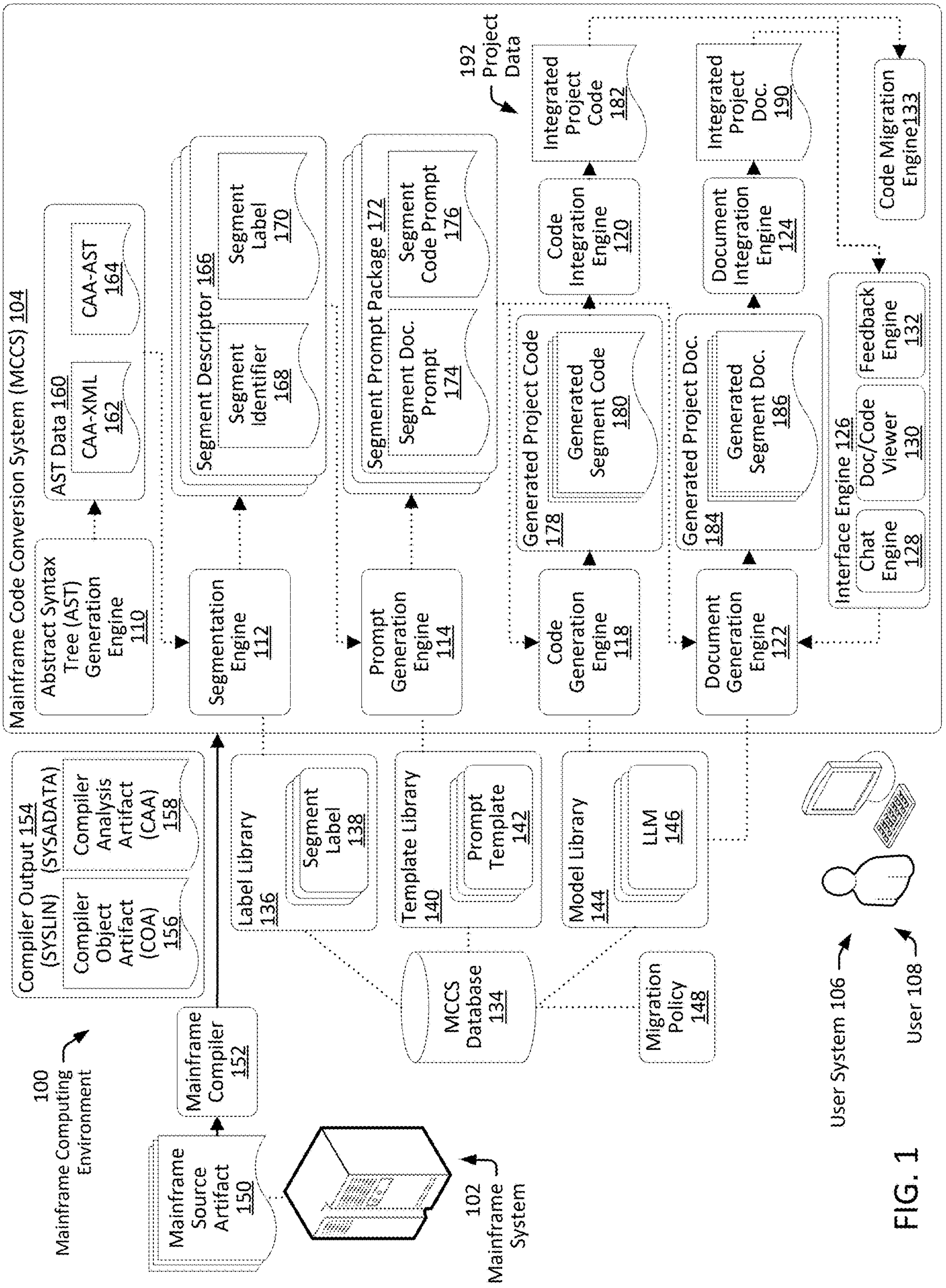
FIG. 1 is a diagram that illustrates a mainframe computing environment in accordance with one or more embodiments.

While this disclosure is susceptible to various modifications and alternative forms, specific example embodiments are shown and described. The drawings may not be to scale. The drawings and the detailed description are not intended to limit the disclosure to the form disclosed, but are intended to disclose modifications, equivalents, and alternatives falling within the spirit and scope of the present disclosure as defined by the claims.

DETAILED DESCRIPTION

Described are embodiments of systems and methods for transforming legacy mainframe software artifacts into integrated project code and accompanying documentation using a compiler-guided transformation pipeline. In some instances, rather than relying on text-based parsing of source files, the disclosed system compiles a legacy mainframe-source artifact (MSA) using a mainframe compiler to produce a compiler object artifact (COA) and a compiler analysis artifact (CAA). The CAA provides a fully parsed, compiler-resolved representation of the program—including expanded copybooks, data definitions, symbol references, and control-flow structure—which is converted to machine-readable XML and parsed to form a canonical abstract syntax tree (CAA-AST). A segmentation engine walks the CAA-AST to define logical code segments based on dependency closure, each associated with a segment identifier and a segment label. For each segment, a prompt generation engine produces a segment documentation prompt and a segment code prompt, which are applied to one or more selected large language models (LLMs) to generate structured documentation (by a document-generation engine) and corresponding source code (by a code-generation engine), such as Java classes, interfaces, and data-access components. The outputs are aggregated, deduplicated, and integrated into an executable project code bundle and corresponding documentation package (by a code integration engine and documentation integration engine), after which the deployment artifacts can be produced (by a code-migration engine) for a target runtime. An interface engine (including a chat engine) presents the results in a user-facing environment that supports interactive review, natural-language querying backed by vectorized embeddings of the generated documentation and code, and regeneration of segments in response to feedback.

As described, certain embodiments leverage compiler-derived artifacts and hybrid static-dynamic analysis to produce accurate, modular, and context-aware transformations of legacy mainframe code. By aligning documentation and code generation within the same transformation pipeline, and incorporating role-specific templates, domain models, and retrieval-augmented chat interaction, the system provides an efficient and scalable modernization pathway suitable for large-scale enterprise migration programs—while reducing SME dependency and improving long-term system comprehensibility. Moreover, these techniques offer concrete improvements in computational performance and transformation throughput. For example, by relying on compiler-generated analysis artifacts (e.g., CAA) that encode a fully parsed and symbol-resolved representation of the source program, the system avoids repetitive grammar-based tokenization and redundant parsing operations. Segment-level prompt generation localizes processing to dependency-closed subgraphs of the abstract syntax tree, enabling deterministic prompt construction and reducing resource consumption. Output deduplication during integration further improves efficiency by eliminating redundant code artifacts, while the migration engine automates packaging and deployment, shortening release cycles. Collectively, these features may reduce transformation latency, increase throughput across large codebases, and enhance the responsiveness of interactive feedback workflows—thereby improving the overall performance and scalability of the systems executing the transformation pipeline.

Although certain embodiments are described in the context of transforming COBOL-based mainframe source artifacts into Java-based project code, for the purpose of explanation, the systems and methods described herein may not be limited to any particular source or target programming language. For example, the disclosed techniques may be applied to any suitable legacy source environment—including, but not limited to, PL/I, JCL, or assembler—and may target a variety of modern programming languages or deployment environments, such as Python, C#, Go, or cloud-native frameworks. Accordingly, references to COBOL or Java throughout this disclosure are made for illustrative clarity and are not intended to limit the scope of the claimed invention. Although certain embodiments are described in the context of a mainframe and a mainframe compiler, the systems and methods described herein may not be limited to mainframe environments. For example, the disclosed techniques may be applied in an environment that employs a compiler that emits structured analysis artifacts—such as parse trees, symbol tables, or cross-reference records.

FIG. 1 is a diagram that illustrates a mainframe computing environment 100 in accordance with one or more embodiments. In the illustrated embodiment, mainframe computing environment 100 includes a mainframe computing system 102 and a mainframe code conversion system (MCCS) 104. The MCCS 104 includes an abstract syntax tree (AST) generation engine 110, a segmentation engine 112, a prompt generation engine 114, a code generation engine 118, a code integration engine 120, a document generation engine 122, a document integration engine 124, and an interface engine 126 (which includes a chat engine 128, a doc/code viewer 130, a feedback engine 132), and a code migration engine 133. The MCCS 104 further includes a MCCS database 134, storing, for example, a label library 136 (e.g., including one or more segment labels 138), a template library 140 (e.g., including one or more prompt templates 142), a model library 144 (e.g., including one or more large language models (LLMs) 146), and a migration policy 148 (e.g., YAML or JSON files referenced by the code migration engine 133). In some embodiments, the MCCS 104 includes a computer system that is the same or similar to computer system 1000 illustrated and described with regard to FIG. 5. The environment 100 may also include a user system 106 and a user 108. In some embodiments, the user system 106 includes a computer system that is the same or similar to computer system 1000 illustrated and described with regard to FIG. 5.

In some embodiments, mainframe system 102 includes a mainframe source artifact (MSA) 150 and a mainframe compiler 152 operable to compile the MSA 150 to produce compiler output 154, which includes a compiler object artifact (COA) 156 (e.g., a SYSLIN file) and a compiler analysis artifact (CAA) 158 (e.g., a SYSADATA file). The compiler output 154 is provided to the MCCS 104, where it is processed to generate integrated project code (e.g., Java-type source code) and corresponding project documentation.

For example, the AST generation engine 110 may receive the compiler output 154, including the CAA 158 and generate corresponding AST data 160, including generating a CAA-XML 162 representation of the CAA 158, and using that CAA-XML 162 representation to generate a corresponding CAA-AST 164 graph structure.

The segmentation engine 112 may then analyze the CAA-AST 164 to identify logical code segments (or "chunks") and generate segment descriptors 166, with each segment descriptor including a segment identifier 168 and a segment label 170 (e.g., determined based on a predetermined segment label 138 retrieved from the label library 136).

The prompt generation engine 114 may process each of the segment descriptors 166 to generate a corresponding segment prompt package 172 that includes a segment documentation prompt 174 and a segment code prompt 176 for the associated logical code segment. The segment documentation prompt 174, or the segment code prompt 176, may be generated using associated prompt templates 142 retrieved from the template library 140 and directed to selected models 146 from the model library 144. In some embodiments, the prompt template 142 or the model 146 is selected based on associated context, such as a segment label 170 for the segment, or the role of a user 108 (e.g., a developer or non-technical reviewer) the segment prompt package is being generated.

The code generation engine 118 and the document generation engine 122 may then process the prompts using the selected prompt template 142 and the selected large language model (LLM) 146 to produce corresponding generated segment code 180 and corresponding generated segment documentation 186, respectively. The generated segment code 180 for each of the segments may be combined into generated project code 178, which is processed by the code integration engine 120 to generate integrated project code 182. Similarly, the generated segment documentation 186 for each of the segments may be combined into generated project documentation 184, which is processed by the document integration engine 124 to produce integrated project documentation 190. The integrated project code 182 may then be passed to a code migration engine 133 to generate deployment artifacts for a target runtime.

The interface engine 126 may receive project data 192, including the integrated project code 182 and the integrated project documentation 190, and present the information in an interactive user interface of a user system 106 for consumption by a user 108. The interface engine 126 may include the chat engine 128, which is adapted to provide an interactive interface that enables chat-type user interaction with the integrated project code 182 and project documentation 190, the document/code viewer 130, which is adapted to present the integrated project code 182 and the project documentation 190 in a coordinated, for example, side-by-side format to facilitate comprehension and exploration, and the feedback engine 132, which is adapted to receive user feedback, such as user proposed updates, corrections, or enhancement suggestions, and coordinate execution of corresponding updates to the integrated project documentation 190 and integrated project code 182, for example, by prompting the document generation engine 122 or the code generation engine 118 to regenerate specific segments in response.

Such a system may provide for an efficient, scalable, and accurate transformation of legacy mainframe source artifacts (e.g., COBOL-based MSA 150) into modernized and maintainable output code (e.g., Java-based integrated project code 182) accompanied by role-specific documentation (e.g., integrated project documentation 190). This can allow for reduced reliance on subject-matter experts (SMEs), shortened transformation timelines, and improved maintainability of mission-critical applications previously locked within aging mainframe environments.

Mainframe Computing Environment 100

In some embodiments, the mainframe computing environment 100 includes the infrastructure required to compile and execute legacy programs developed for enterprise mainframe platforms. This environment may include systems capable of executing Job Control Language (JCL) scripts, handling COBOL or PL/I compilation, and producing compiler outputs in standardized formats. For example, the mainframe computing environment 100 may include IBM z/OS infrastructure executing batch jobs that compile COBOL applications using the IBM Enterprise COBOL compiler. In the context of an example of the present disclosure, the mainframe computing environment 100 may compile, using a mainframe complier 152 of the mainframe system 102, a mainframe source artifact 150 (e.g., a source program) named PAYROLL using a job that emits both executable object code and an analysis output that includes a compiler-generated analysis artifact (CAA) (e.g., a SYSADATA file). Providing a well-defined mainframe environment may ensure compatibility with legacy toolchains while enabling deterministic extraction of analysis data, which may improve the traceability and reproducibility of the transformation pipeline.

Mainframe System 102

In some embodiments, the mainframe system 102 is a computing node or logical partition (LPAR) within the mainframe computing environment 100 that is responsible for compiling and executing the legacy mainframe-source artifact (MSA). The mainframe system may include a dataset management system, compiler suite, and access to partitioned data sets (PDS) for storing source and compiled modules. For example, the mainframe system 102 may process a member PAYROLL.COB located in a PDS such as BNY.SOURCE.COBOL and compile it using a JCL job configured with ADATA options enabled, thereby generating both a SYSLIN object file and a SYSADATA binary analysis file that serves as the compiler analysis artifact (CAA) 158. Having the mainframe system emit a structured analysis output as part of a standard compilation job may allow subsequent transformation steps to rely on fully compiler-resolved data rather than inferring syntax via fragile parsers. This technical approach may improve determinism and precision in the code transformation process and may help establish that the system performs a specific technological improvement based on heuristic parsing.

Mainframe-Source Artifact (MSA) 150

In some embodiments, the mainframe-source artifact (MSA) 150 is a human-readable source program designed for execution within the mainframe computing environment. The MSA may include COBOL source code, JCL scripts, copybook includes, CICS transaction definitions, or other domain-specific language artifacts. For example, the MSA 150 may be a COBOL program titled PAYROLL, comprising 32,000 lines of code across two source members and including references to several copybooks (e.g., EMPREC01.cpy, TAXCODE.cpy) defining data structures for employee payroll and taxation. The MSA may serve as the canonical source of business logic and domain knowledge. By preserving this artifact and using it as the starting point of transformation, the disclosed system may ensure semantic fidelity between legacy systems and their modernized counterparts. This may help support maintainability and preserve business continuity during migration.

Mainframe Compiler 152

In some embodiments, the mainframe compiler 152 is a legacy-mainframe compilation utility operable to translate the mainframe-source artifact (MSA) 150 into both executable machine code and auxiliary analysis metadata. The mainframe compiler 152 may include support for generating compiler object artifacts (COAs) and compiler analysis artifacts (CAAs) as part of its standard job execution. For example, the mainframe compiler 152 may be the IBM Enterprise COBOL compiler invoked with ADATA and LIST options enabled. When compiling the PAYROLL program, the mainframe compiler 152 may generate a SYSLIN output containing the executable object module (COA 156) and a SYSADATA binary file containing parse trees, tokenized source lines, and symbol tables (CAA 158). In this manner, the mainframe compiler 152 may act as the root of the transformation process by emitting both the runtime object and a fully parsed, machine-readable representation of the source. Generating the CAA as part of the compile step may avoid the need for downstream text-based parsers and may enable deterministic extraction of syntactic and semantic structure. This approach may support a specific technological improvement by offloading the parsing burden to a verified compiler and reducing the variability associated with custom or handwritten parsing grammars.

Compiler Output 154

In some embodiments, the compiler output 154 includes one or both the compiler object artifact (COA 156) and the compiler analysis artifact (CAA 158). The compiler output 154 may be stored in physical data sets or passed programmatically to downstream modules within the mainframe code conversion system (MCCS) 104. For example, the compiler output 154 for the PAYROLL program may include the following: (i) a SYSLIN file, which contains a relocatable object module suitable for linkage editing or deployment, and (ii) a SYSADATA file, which contains tokenized and symbol-resolved analysis data corresponding to the compiled source. These outputs may, for example, be captured and archived in staging datasets for processing by the MCCS 104. Decoupling the executable object code from the analysis metadata may allow the system to perform transformation and verification steps in parallel with deployment workflows. Additionally, because the CAA contains a high-fidelity parse tree, it may provide a more accurate and complete starting point for downstream transformation operations, such as segmentation and code and document generation, than conventional grammar-driven parser systems.

Compiler Object Artifact (COA) 156

In some embodiments, the compiler object artifact (COA) 156 is a machine-executable output of the mainframe compiler 152 that contains compiled instructions derived from the mainframe-source artifact. The COA 156 may be suitable for linkage or execution in a mainframe runtime environment. For example, the COA 156 may include the SYSLIN file for the PAYROLL program, which includes compiled binary instructions and linkage metadata that can be passed to a binder or stored in a LOADLIB. While the COA is not directly transformed by the MCCS 104, it may be used for auditing, traceability, or runtime comparison. Storing the COA alongside the transformation outputs may enable auditors or reviewers to validate semantic equivalence between the legacy binary and the modernized application, which may strengthen the verifiability and trustworthiness of the transformation process. FIG. 3A illustrates an example COA 156 in accordance with one or more embodiments. The illustrated example shows a SYSLIN header with relocation and reference entries suitable for linkage-editing and traceability analysis.

Compiler Analysis Artifact (CAA) 158

In some embodiments, the compiler analysis artifact (CAA) 158 is a compiler-generated binary file that includes a machine-readable structural and semantic representation of the source program. The CAA 158 may encode parse-tree records, symbol definitions, source-line expansions, and cross-reference tables that describe the compiled program's internal structure. For example, the CAA 158 for the PAYROLL program may include binary records for each COBOL division, a token stream with source line mappings, symbol definitions for each working-storage item, and references that map variable usage to their declaration points. The CAA is typically output as a SYSADATA file in IBM compiler environments. The SYSADATA file may include a standardized set of record types such as "Parse Tree Records" (defining hierarchical structure), "Source Records" (storing expanded source lines), "Symbol Records" (defining declared identifiers), "Token Records" (providing lexical tokens with location metadata), and "Symbol Cross-Reference Records" (capturing every point where each symbol is used). Each record may be emitted in a binary format defined by the COBOL compiler specification and may enable precise reconstruction of both the static control structure and the data relationships present in the original program. Using the CAA as the starting point for AST generation may provide a canonical and fully resolved source structure that eliminates the need for hand-authored parsers. This approach may reduce hallucination risk in subsequent LLM-based steps and may establish a concrete, reproducible transformation baseline—both of which are technical improvements. FIG. 3A illustrates an example CAA 158 in accordance with one or more embodiments. The illustrated example shows a human-readable rendering of SYSADATA record fields including cross-reference and parse-tree entries.

In some embodiments, the CAA is a form other than an IBM SYSADATA file. For example, another compiler-emitted analysis artifact that encodes (i) a parse tree and (ii) symbol metadata may be employed, such as PL/I F-list analysis files, Micro Focus COBOL.idy symbol tables, LLVM bitcode accompanied by DWARF debug sections, or the like. Regardless of the file type, embodiments may include transforming the artifact into an intermediate XML or JSON serialization that maps one-to-one with the canonical CAA-AST schema, as described.

In some embodiments, the compiler-analysis artifact (CAA), such as an IBM SYSADATA file, includes a standardized set of record types that encode structural and semantic aspects of the source program. For example, the record types may include source records, parse tree records, token records, symbol records, and symbol cross-reference records, each of which may contribute to a unified representation of the compiled program.

In some embodiments, the abstract syntax tree (CAA-AST) is constructed using a combination of parse tree records, token records, and source records. For example, parse-tree records may define the program's structural hierarchy (e.g., procedures, conditions, loops), token records encode lexical elements and their source positions, and source records preserve original COBOL source lines and line numbers. This process may enable deterministic reconstruction of program control flow and logic.

In some embodiments, static analysis performed on the CAA-AST supports extraction of runtime behavior insights without executing the legacy program. For example, the system may identify independent logical components—such as COBOL paragraphs, sentences, or compound statements—along with their associated dependencies, such as called paragraphs or referenced data definitions. This analysis may assist with segmentation, documentation, and refactoring workflows.

In some embodiments, the CAA-AST enables extraction of input/output definitions from the legacy source. For example, the system may detect file declarations (e.g., VSAM datasets), embedded SQL operations (e.g., DB2 tables), and transactional commands (e.g., EXEC CICS statements) based on recognizable constructs present in the parsed structure. This capability may help preserve or restructure external interface definitions during transformation.

In some embodiments, static analysis of the CAA-AST is used to identify program elements that are unreachable or unused. For example, code paths or variable definitions that are not referenced during control-flow traversal may be flagged as dead code. Removing such elements may improve efficiency and readability of the transformed outputs.

In some embodiments, symbol records are used to reconstruct COBOL data definitions. For example, the system may extract layout information such as data types, byte offsets, PICTURE clauses, and REDEFINES hierarchies, which may be mapped into structured data objects in the target-language code.

In some embodiments, symbol cross-reference records are used to determine how each data element is used across the program. For example, the system may identify whether a variable is read, written, or passed between segments, and associate these usage patterns with specific source line references. This information may support data lineage tracking and enable accurate regeneration of functional dependencies.

In some embodiments, the use of compiler-generated artifacts provides advantages over traditional parsing-based analysis tools. For example, tools built using ANTLR or Tree-sitter grammars may work effectively for modern distributed languages such as Java or Python, but may struggle with COBOL due to dialect-specific variations, copybook expansion, or legacy syntax. By relying on the SYSADATA file as an authoritative source, the disclosed system may achieve greater accuracy, completeness, and determinism.

Mainframe Code Conversion System (MCCS) 104

In some embodiments, the mainframe code conversion system (MCCS) 104 is a computing system operable to transform compiler outputs into integrated project code and documentation using a series of coordinated processing engines and libraries. The MCCS 104 may include engines for syntax tree generation, segmentation, prompt construction, and language-model invocation, as well as integration and feedback subsystems. The MCCS 104 may further include a code-migration engine for generating deployment artifacts based on policy inputs. For example, the MCCS 104 may run as a containerized service hosted in a private cloud environment. It may receive the COA 156 and CAA 158 of the compiler output 154 from the PAYROLL program, process the CAA 158 to generate an abstract syntax tree (CAA-AST 164), and apply LLM-based transformations to generate Java code implementing payroll functions, along with role-specific documentation for architects, developers, and compliance teams. By encapsulating the transformation pipeline in a modular architecture, the MCCS may support scalability, parallelism, and model-agnostic execution. This modularity may improve the system's extensibility and maintainability and may enable selective regeneration of segments or documentation as user feedback is incorporated. It may also allow the resulting artifacts to be deployed to multiple runtime environments without modifying the core transformation logic. This modular design may further support arguments that the system embodies a specific, concrete improvement in computer functionality.

AST Generation Engine 110

In some embodiments, the abstract syntax tree (AST) generation engine 110 is a module within the MCCS 104 that converts the compiler analysis artifact (CAA) 158 into a machine-readable XML representation (CAA-XML 162) and parses that representation into an in-memory graph structure (CAA-AST 164) representing the full syntactic and semantic content of the source program. For example, the AST generation engine 110 may apply a custom parser to the SYSADATA binary (CAA 158) from the PAYROLL program, generating an XML file (CAA-XML 162) that encodes program structure, variable definitions, file sections, and paragraph control flow. This XML may then be parsed into a tree-structured in-memory object graph that forms the CAA-AST 164. The custom parser may be implemented as a REXX-based utility or equivalent logic written in a scripting language such as Python or Java. It may be adapted to read each SYSADATA record type, extract structured data fields, and emit well-formed XML tags that preserve nesting, cross-references, and symbol provenance. The parser may also attach metadata such as source line numbers, copybook origins, and usage frequencies to corresponding nodes. Using the compiler's binary output as the basis for the AST may eliminate grammar drift and copybook expansion errors common in handwritten parsers. This transformation may form the canonical internal representation for all downstream operations and may serve as a machine-verifiable anchor for traceability, deduplication, and prompt construction. The AST generation engine 110 may, for example, be, or otherwise define, a software agent that can autonomously operate on incoming data, relying on distribution of tasks to other processing engines, such as sub-agents.

In some embodiments, a parser converts the compiler-analysis artifact (CAA 158) from its binary record format into an extensible, schema-validated XML serialization (CAA-XML 162). The parser may handle four representative SYSADATA record types as follows. A PTR (Parse-Tree) record may signal the start of a compiler-recognized construct such as a COBOL paragraph, prompting the parser to emit a <Procedure> element and copy the paragraph name and starting line number into <name> and <line> attributes. Each SRC (Source-Line) record, which contains the original COBOL text and its internal sequence number, may be transformed into a <Line> element whose <num> and <text> attributes preserve that information verbatim for round-trip traceability. When a SYMDEF (Symbol-Definition) record declares a data item, the converter may create a <DataItem> element and map the COBOL PIC clause to a <pic> attribute so later tooling can infer size and type. Every XREF (Cross-Reference) record may become an <Xref> element that links a symbol identifier to each line number where the symbol is referenced, thereby preserving usage information essential for dependency analysis. This direct, field-to-attribute mapping may ensure that no semantic detail is lost during serialization while giving downstream components a schema-validated, human-readable representation. Because the XML is lossless with respect to the binary CAA, the system may round-trip between formats for audit purposes or export the XML to third-party analysis tools. Storing the analysis data as XML may provide several computer-centric advantages: schema validation may detect corruption before the transformation pipeline starts, improving robustness; streaming SAX/STaX parsing may permit constant-memory processing of very large programs—such as SYSADATA files exceeding ten megabytes—on commodity hardware, boosting throughput; and language neutrality may let external diff viewers, impact analyzers, and security scanners consume the same artifact without bespoke COBOL parsers, enhancing interoperability.

Segmentation Engine 112

In some embodiments, the segmentation engine 112 is a processing module within the MCCS 104 operable to analyze the CAA-AST 164 and divide it into a plurality of logical code segments. Each segment may be associated with a segment identifier 168 and a segment label 170, which may be determined based on static dependencies, structural completeness, and runtime metadata. For example, the segmentation engine 112 may analyze the CAA-AST 164 for the PAYROLL program and identify a CALC-TAX paragraph as a logical segment. The segment may include associated working-storage data definitions, SQL statements, and file definitions as well as embedded CICS statements and subordinate procedure paragraphs referenced by control-flow edges. The segmentation engine 112 may assign it a unique segment identifier 168 and a segment label 170 such as "Control-Flow Logic" or "Relational-Query Operation," retrieved from a predefined label library 136. In some embodiments, the segmentation engine 112 may traverse data-reference edges and CALL relationships within the CAA-AST 164 until a dependency-closure condition is met (e.g., no unresolved external references remain), ensuring that each segment is self-contained and syntactically complete. Segments may include overlapping nodes where multiple logical paths depend on the same variables or paragraphs. In some embodiments, the segmentation engine 112 may also evaluate token-length budgets associated with downstream prompt-generation constraints and may split or compact segments accordingly. In some embodiments, each segment may correspond to one of several content types reflected in the label taxonomy: for example, a segment encompassing COBOL 01 records may be labeled "Data-Structure Definition"; a segment containing SELECT or EXEC SQL may be labeled "Relational-Query Operation"; a segment containing EXEC CICS may be labeled "Transactional-API Call"; and a procedural block containing arithmetic and conditional verbs may be labeled "Control-Flow Logic." Additional segment types may include file access routines (e.g., VSAM I/O blocks), error handlers, or initialization code blocks. Segments may be tagged with one or more labels concurrently, and these labels may influence both the prompt templates used and the types of outputs requested. By generating dependency-closed segments, the segmentation engine may ensure that downstream prompt generation and LLM processing receive complete input contexts, which may reduce hallucination and improve regeneration determinism. This step may serve as a technical improvement in the functioning of the system by enforcing logical completeness within bounded token windows. The segmentation engine 112 may, for example, be, or otherwise define, a software agent that can autonomously operate on incoming data, relying on the distribution of tasks to other processing engines, such as sub-agents.

In some embodiments, segmentation of the program is performed by traversing the abstract syntax tree (CAA-AST) to identify structural entry points in the legacy source. For example, the system may locate nodes corresponding to COBOL paragraph declarations and treat each as a candidate for logical segmentation.

In some embodiments, a control-flow graph is constructed using the identified paragraph nodes as vertices. Edges in the graph may represent explicit control transfers between paragraphs—such as via PERFORM, GOTO, or conditional branching statements—and may be derived from parse-tree records and token-based flow annotations extracted from the CAA.

In some embodiments, the segmentation engine begins traversal at leaf nodes in the control-flow graph and proceeds in a bottom-up fashion toward the root entry point of the program. For example, leaf nodes may represent paragraphs that do not invoke any other paragraphs, allowing the system to identify self-contained logic blocks. As the traversal ascends, dependent nodes and their upstream callers may be merged or grouped based on dependency closure and prompt budget constraints. This traversal strategy may allow the segmentation engine to define logical units of work that are both syntactically complete and semantically traceable. For example, segments generated using this method may include the minimal set of COBOL statements, data items, and nested calls required to preserve functional behavior while remaining within the token limits of downstream large language model (LLM) inference steps.

AST Data 160

In some embodiments, AST data 160 designates the collection of intermediate program-structure artifacts that lie between the raw compiler analysis artifact and the higher-level logical models consumed by downstream engines. The AST data 160 may function as a boundary object that decouples low-level compiler formats from the remainder of the transformation pipeline, enabling independent evolution of either side without breaking compatibility. In the illustrated embodiment, AST data 160 includes at least two concrete representations—the XML serialization (CAA-XML 162) and the canonical in-memory graph (CAA-AST 164). Each representation may be lossless with respect to the other, thereby allowing round-trip verification when auditing transformations.

In some embodiments, the segmentation engine 112 walks the CAA-AST 164 to partition the program into logical segments. For example, the engine may identify a dependency-closed set of nodes that defines each logical segment. The engine may begin at a root procedure node (such as a paragraph entry point), enqueue every data item referenced by that procedure, and enqueue every paragraph invoked by a PERFORM or CALL statement. While the queue is not empty, the engine may dequeue a node, add it to the candidate set, and enqueue any additional data items or paragraphs referenced by that node, thereby expanding the set until no unmet dependencies remain. Once closure is reached, the engine may compute a deterministic identifier for the segment—such as a SHA-256 digest of the included node IDs—and may classify the segment using a predefined label taxonomy (for example, Control-Flow Logic or Relational-Query Operation). If the combined token count of the nodes exceeds a configurable prompt budget, the engine may partition the segment along paragraph boundaries and repeat the closure operation for each partition until all resulting segments fit within the configured limits. This traversal strategy may ensure that every segment supplied to downstream prompt generation is context-complete, which reduces hallucinations, enables parallel processing, and improves regeneration determinism.

CAA-XML 162 (XML Serialization of the Compiler Analysis Artifact)

In some embodiments, CAA-XML 162 is a machine-readable Extensible Markup Language rendition of the compiler analysis artifact 158. A custom parser may read each SYSADATA record, maps record-type fields to element names, and emits a hierarchically nested document that preserves both structural and location metadata. For example, a <Program> root element may enclose <IdentificationDivision>, <DataDivision>, and <ProcedureDivision> children; each <Procedure> element may carry attributes such as name="CALC-TAX" and line="420" while embedding statement-level elements (e.g., <If>, <Move>). Line-number and copybook-origin attributes may provide deterministic trace-back to original source lines, enabling the system to reconstruct exact provenance when generating documentation or responding to chat queries. Because CAA-XML 162 is schema-validating and platform-neutral, it may facilitate interchange with external analysis tools and simplifies diff-based regression testing. FIG. 3A illustrates an example CAA-XML 162 fragment.

CAA-AST 164 (Canonical Abstract Syntax Tree)

In some embodiments, CAA-AST 164 is an in-memory, object-graph representation obtained by parsing CAA-XML 162. Nodes may correspond to compiler-resolved program elements (paragraphs, data items, SQL verbs, CICS commands, etc.), each assigned a stable identifier derived from the underlying XML element ID. Directed edges may encode multiple relationship types, including: Control-flow edges that connect predicates, branches, and paragraph CALLs; Data-reference edges that link usage sites to their declarations, enabling closure analysis during segmentation; and Copybook-expansion edges that preserve the origin of included records for downstream traceability. The AST may exposes visitor and query APIs that allow the segmentation engine 112 to walk dependencies until a dependency-closure condition is met (e.g., no unresolved external references remain), guaranteeing that every logical segment is context-complete. Because CAA-AST 164 is fully resolved by the trusted compiler, it may eliminate grammar drift that often plagues handwritten COBOL parsers and thereby reduces hallucination risk when prompts are later assembled. FIG. 3A illustrates an example textual rendering of a CAA-AST 164 subtree.

Segment Descriptor 166

In some embodiments, a segment descriptor 166 is a data structure generated by the segmentation engine 112 that describes a specific logical segment extracted from the CAA-AST 164. Each segment descriptor may include a segment identifier 168 that uniquely identifies the segment and a segment label 170 that categorizes its contents or functional role. In some embodiments, the descriptor may include multiple segment labels representing all applicable functional categories for the segment. For example, a segment descriptor 166 corresponding to the CALC-TAX paragraph in the PAYROLL program may have a segment identifier 168 such as CH-"CALC-TAX" and a segment label 170 such as "Control-Flow Logic." In some embodiments, the segment descriptor 166 includes metadata such as token counts, source line ranges, references to included data items, or runtime heat metrics derived from SMF logs. In some embodiments, the segment descriptor 166 may also include references to overlapping chunk sets or shared dependencies to facilitate deduplication and merge-time reconciliation. Segment descriptors may be passed to the prompt generation engine 114 for construction of targeted prompts. Structuring each segment descriptor as a discrete input object may allow downstream engines to operate independently on distinct parts of the program and may support fine-grained regeneration and selective documentation workflows. FIG. 3A illustrates an example segment descriptor 166 in accordance with one or more embodiments. The illustrated descriptor includes a label set, node count, and identifier hash derived from AST nodes.

Segment Identifier 168

In some embodiments, the segment identifier 168 is a globally unique identifier associated with a segment within the CAA-AST 164. The segment identifier 168 may be derived from AST node hashes, source line ranges, or other deterministic attributes to allow traceability. For example, the segment identifier 168 for the CALC-TAX paragraph in the PAYROLL program may be computed by hashing the concatenated node identifiers of all included AST elements. In some embodiments, the identifier may follow a standardized naming pattern such as "CH-XXXX" where XXXX is a digest of included elements. Having a stable, unique identifier per segment may enable repeatable generation, differential tracking, and merge conflict resolution during code integration.

Segment Label 170

In some embodiments, the segment label 170 is a categorical tag assigned to a segment to describe its primary content type or function. Labels may be drawn from a label library 136 and may include categories such as "Data-Structure Definition," "Persistent-Storage Definition," "Relational-Query Operation," "Transactional-API Call," or "Control-Flow Logic." For example, the CALC-TAX segment from the PAYROLL program may be assigned multiple labels, including "Control-Flow Logic" and "Relational-Query Operation," if it contains SQL operations embedded in a procedural paragraph. In some embodiments, labels may guide prompt template selection and model invocation decisions downstream. Categorizing segments at this stage may facilitate role-specific prompt construction and may support flexible documentation formats depending on the user persona.

Prompt Generation Engine 114

In some embodiments, the prompt generation engine 114 is a module within the MCCS 104 that constructs a segment prompt package 172 for each segment based on its corresponding segment descriptor 166. Each segment prompt package 172 may include a segment documentation prompt 174 and a segment code prompt 176. For example, for the segment associated with the CALC-TAX paragraph in the PAYROLL program, the prompt generation engine 114 may retrieve a template from the template library 140 based on the segment label or label set (e.g., "Control-Flow Logic") and a target user persona such as "Back-End Developer." The retrieved template may include placeholder fields for: source-language statements, cross-referenced variable definitions, runtime performance metrics, and domain tags (e.g., BIAN subdomains). For "Control-Flow Logic," the prompt may instruct the LLM to generate a Java method with appropriate control structures, while for "Relational-Query Operation," it may request SQL-mapped Java DAO methods. In some embodiments, the prompt generation engine 114 may operate as a stateless agent that retrieves dynamic prompt parameters per request, enabling on-the-fly template adaptation based on user role, project standards, or target platform constraints. The engine may then generate a segment documentation prompt 174 requesting a business-readable description of the paragraph's purpose and a segment code prompt 176 requesting Java code implementing its functionality. In some embodiments, the engine may incorporate call-frequency metrics or performance annotations into the prompt text to further contextualize the transformation. Constructing targeted prompts per segment may reduce LLM token usage, localize reasoning, and improve response consistency, which may constitute a technical improvement in prompt-based program synthesis. The prompt generation engine 114 may, for example, be, or otherwise define, a software agent that can autonomously operate on incoming data, relying on the distribution of tasks to other processing engines, such as sub-agents.

Segment Prompt Package 172

In some embodiments, the segment prompt package 172 is a composite data structure comprising a segment documentation prompt 174 and a segment code prompt 176 for a specific logical segment. For example, the segment prompt package for the CALC-TAX segment may contain: (i) a prompt to generate Markdown documentation explaining tax calculation rules, and (ii) a prompt to generate Java code implementing tax logic based on embedded SQL queries. These prompts may be generated from separate documentation and code prompt templates retrieved from the template library 140. The documentation template may include persona language (e.g., "Explain for a Business Analyst"), while the code prompt template may include coding conventions (e.g., Java 17, Spring Boot annotations, error-handling style). In some embodiments, each prompt may include the raw COBOL lines, AST-derived metadata, and any labels, label sets, or runtime metrics associated with the segment. In some embodiments, the segment prompt package 172 may also include version tags or generation history hashes to facilitate auditability and incremental regeneration. Packaging both documentation and code prompts together may support consistent transformation logic across modalities and may facilitate parallel processing using distinct LLM models.

Segment Documentation Prompt 174

In some embodiments, the segment documentation prompt 174 is a natural-language request designed to elicit role-specific documentation describing a segment's functionality. The prompt may be generated using a template selected based on the segment label or label set and a user role or persona. For example, the documentation prompt 174 for the CALC-TAX segment may read: "As a back-end developer, explain the business logic and data dependencies in the following COBOL paragraph." The prompt may include annotated source code, data references, and runtime metrics. In some embodiments, persona-specific templates may alter the vocabulary and structure of the prompt to match audience expectations. For example, a prompt for a Business Analyst may exclude implementation details and emphasize input/output structure and BIAN domain mappings; a prompt for a QA tester may highlight test conditions, edge cases, and expected outputs. Using tailored documentation prompts may improve the clarity, utility, and relevance of generated documentation and may help reduce the need for manual SME intervention. FIG. 3B illustrates an example segment documentation prompt 174 in accordance with one or more embodiments. The illustrated prompt includes both source code and persona cues to guide the LLM's generation.

Segment Code Prompt 176

In some embodiments, the segment code prompt 176 is a structured prompt constructed to elicit source code in a target programming language that replicates the functionality of the corresponding legacy segment. For example, the code prompt 176 for the CALC-TAX segment may include COBOL source lines that perform SQL queries and arithmetic operations, along with instructions to generate a Java method that returns computed tax values. In some embodiments, the prompt may also specify constraints such as programming style (e.g., Spring Boot compatible), language version, or architectural context (e.g., microservice). The segment code prompt 176 may be constructed from a code-specific prompt template, which may include directives for naming conventions, exception-handling strategies, and integration patterns. For example, for a "Persistent-Storage Definition" segment, the prompt may request a POJO annotated for JPA, while for a "Transactional-API Call" segment, it may request a REST interface stub mapped to a CICS transaction ID. Providing well-structured code prompts per segment may enhance LLM output quality, reduce hallucinations, and enable deterministic re-generation of transformed code. FIG. 3B illustrates an example segment code prompt 176 in accordance with one or more embodiments. The figure shows a COBOL logic block alongside its templated Java-generation instructions.

Document Generation Engine 122

In some embodiments, the document generation engine 122 is a module within the MCCS 104 operable to apply the segment documentation prompt 174 to a selected large language model (LLM) 146 from the model library 144 to generate role-specific documentation for the corresponding segment. The generated documentation for a segment 186 may include structured narrative explanations, input/output annotations, BIAN domain labels, and other metadata relevant to the user persona. For example, the document generation engine 122 may apply the documentation prompt for the CALC-TAX segment to a chat-optimized LLM tuned for enterprise applications, resulting in Markdown documentation describing how payroll taxes are calculated, which input fields are required, and which outputs are produced. In some embodiments, the document generation engine 122 may also post-process the LLM output to conform to formatting requirements (e.g., Markdown, HTML, or Confluence-compatible output) and may inject traceability tags that link narrative blocks to source AST nodes, facilitating auditability and source mapping. In some embodiments, the document generation engine 122 may select the LLM based on user persona, document type, or project-specific documentation policies. For example, the engine may select a compliance-tuned model when generating documentation for a risk officer persona, resulting in outputs that highlight exception flows, audit trails, and regulatory mappings. By automating the generation of high-fidelity, role-specific documentation for each segment, the engine may reduce SME workload, enhance traceability, and improve the maintainability of the transformed application. The document generation engine 122 may, for example, be, or otherwise define, a software agent that can autonomously operate on incoming data, relying on the distribution of tasks to other processing engines, such as sub-agents.

In some embodiments, document generation includes natural-language transformation of individual program components based on reverse-engineering outputs derived from the source COBOL program. For example, functional documentation may be produced for each paragraph or sentence-level component within the Procedure Division, where sentence-level segmentation refers to sequences of COBOL statements that form logical expressions or business rules. In some embodiments, for paragraphs exceeding a configurable size threshold (e.g., token or line count), sentence-level decomposition may be automatically applied to enable more precise segmentation and more readable documentation.

In some embodiments, each segment or sentence-level component is independently analyzed and assigned a business-domain label based on the BIAN (Banking Industry Architecture Network) framework. For example, segment documentation may include a domain label such as "Payments" and a subdomain label such as "Tax Calculation," derived from the functional semantics of the corresponding COBOL code. In some embodiments, domain and subdomain inference may be implemented using heuristic or learned models that evaluate both control-flow and data references to determine the business context of each component.

In some embodiments, a MapReduce-style strategy is employed to generate higher-level documentation at the program level by aggregating and synthesizing documentation from each segment. For example, documentation may first be generated for individual COBOL chunks using the segment-documentation prompts, and then post-processing steps may combine these outputs into a unified program-level description that preserves logical ordering and domain context. This approach may improve modularity, enable parallel documentation generation, and facilitate easier post-hoc refinement.

In some embodiments, the initial documentation generated from COBOL source code is highly detailed and technical, suitable for review by mainframe developers or subject-matter experts. For example, the segment documentation may include explicit variable references, source line mappings, and procedural annotations. In some embodiments, this documentation is further refined using additional generation passes or persona-specific prompt templates to produce alternate versions tailored to different audiences, such as business analysts, Java developers, or compliance officers. Each version may emphasize different aspects of the segment—such as business logic, architectural mapping, or data lineage—depending on the persona.

In some embodiments, the document generation engine also produces data flow documentation that describes the lineage of critical variables and file references within the COBOL program. For example, the system may identify working-storage fields or input/output file definitions used across multiple segments and trace their propagation paths through the control-flow structure. The resulting documentation may include lineage diagrams, input/output mappings, or narrative summaries explaining how key data elements are derived, consumed, or modified. This information may assist in compliance validation, modernization planning, or test-case generation.

Code Generation Engine 118

In some embodiments, the code generation engine 118 is a module within the MCCS 104 operable to apply the segment code prompt 176 to a selected LLM 146 from the model library 144 to generate target-language source code that replicates the functionality of the corresponding legacy segment. The code generation engine 118 may use a different LLM from the one used for documentation if the code prompt requires a model optimized for structured output or programming-specific tasks. For example, for the CALC-TAX segment, the code generation engine 118 may invoke a code-optimized LLM to produce a Java method that implements tax calculation logic based on embedded SQL statements extracted from the COBOL source. In some embodiments, the engine may also enforce post-processing rules, such as code formatting, compliance with naming conventions, injection of logging or exception-handling patterns, or insertion of annotations (e.g., @Transactional or @Service) depending on the segment label and architectural style. In some embodiments, the code generation engine 118 may route prompts through a fallback cascade of models based on performance metrics, latency, or model availability. For example, if the primary model produces incomplete code for a segment containing nested file access logic, the engine may retry the prompt using a secondary model trained on legacy batch-processing patterns. Generating code through template-guided, LLM-based inference may reduce the need for manual rewriting and may enable scalable transformation of large codebases while preserving semantic intent. The code generation engine 118 may, for example, be, or otherwise define, a software agent that can autonomously operate on incoming data, relying on the distribution of tasks to other processing engines, such as sub-agents.

In some embodiments, the code-generation process addresses limitations observed in traditional legacy-code conversion techniques. For example, conventional COBOL-to-Java translators (e.g., COBOL to JCOBOL) often produce syntactically valid code that is difficult to read, maintain, or extend, thereby inhibiting developer productivity and long-term system evolution. In contrast, the disclosed system emphasizes generation of human-readable, idiomatic source code aligned with modern architectural patterns and project standards.

In some embodiments, the code-generation workflow proceeds in multiple stages. For example, a first stage involves generating a functionally equivalent Java implementation that replicates the behavioral semantics of the original COBOL program. In some embodiments, functional equivalence may be validated by executing a suite of test cases against both the legacy and transformed codebases, comparing outputs to ensure runtime consistency. This equivalence may be defined at the level of method outputs, database effects, or API responses depending on the application context.

In some embodiments, a subsequent stage of the workflow performs architectural refactoring to transform the functionally equivalent Java code into a modular, service-oriented application. For example, monolithic control flows may be decomposed into discrete services or RESTful endpoints, aligned with target platform conventions such as Spring Boot microservices or domain-driven design (DDD) practices. This refactoring may include inserting annotations, defining interfaces, or restructuring control logic to improve maintainability, observability, and runtime scalability.

In some embodiments, the code-generation pipeline includes native support for character-set transformation between legacy and modern encoding formats. For example, the system may automatically insert conversion logic to translate between EBCDIC and ASCII code pages at data ingress and egress points. This may apply to file reads, database fields, or message interfaces. In some embodiments, the conversion routines are applied conditionally based on segment metadata or runtime configuration policies, allowing for flexible deployment in hybrid encoding environments. This out-of-the-box support may reduce integration effort and improve fidelity when modernizing mainframe systems that rely on EBCDIC encoding.

Model Library 144

In some embodiments, the model library 144 is a repository or service registry within the MCCS 104 that stores or indexes a plurality of large language models (LLMs) 146 used for code generation and documentation tasks. The model library 144 may include general-purpose models, domain-specific models fine-tuned for financial services, and lightweight models optimized for interactive chat or fast inference. For example, the model library 144 may contain both a compliance-tuned GPT variant and a Java-specialized code model. In some embodiments, the model library 144 may also store metadata for each model, such as version identifiers, latency profiles, capability tags (e.g., "SQL-aware," "Markdown output"), and role affinity scores, which may be used by downstream engines to select the most appropriate model for a given task. The model library 144 may support dynamic updates, enabling new models to be introduced without redeploying the MCCS. Maintaining a modular and extensible model library may enhance system flexibility, improve inference accuracy, and support heterogeneous enterprise use cases.

Large Language Model (LLM) 146

In some embodiments, a large language model 146 is a transformer-based generative model capable of processing prompts and producing structured natural language or source code output. A LLM 146 may be selected from the model library 144 based on task type, prompt structure, or user persona. For example, the document generation engine 122 may invoke a chat-optimized LLM 146 to generate Markdown documentation for a business analyst persona, while the code generation engine 118 may invoke a separate code-optimized LLM 146 to generate Java methods and POJOs for the same segment. In some embodiments, the LLM 146 may be hosted as an on-premise service for data-governance reasons or accessed via secure API calls to a cloud provider. The LLM 146 may also be wrapped with inference constraints, such as token limits, retry caps, or persona guardrails that filter or format output. Supporting multiple LLMs within a unified transformation pipeline may allow the system to tailor its outputs to role-specific expectations while maintaining architectural separation between code and documentation tasks.

Generated Segment Code 180

In some embodiments, the generated segment code 180 includes source code artifacts produced by the code generation engine 118 in response to segment code prompts 176. Each segment of the legacy mainframe-source artifact may result in one or more target-language code files, such as Java classes, methods, or interface definitions. For example, for the CALC-TAX segment of the PAYROLL program, the generated segment code 180 may include a Java class named TaxCalculator containing methods that replicate COBOL business logic, such as computing tax deductions, accessing SQL-backed lookup tables, or invoking external interfaces. In some embodiments, generated segment code 180 may include annotations, dependency injections, or framework bindings (e.g., Spring Boot annotations) as determined by prompt template logic or post-processing rules. The generated segment code 180 may be stored in a temporary repository prior to integration into a larger codebase by the code integration engine 120. Treating each segment's output as a discrete artifact may allow for traceable assembly, deduplication, and selective regeneration, improving modularity and transformation scalability. FIG. 3B illustrates a representative Java class generated from a COBOL paragraph. The illustrated example shows a generated segment code 180 in the form of a Java class TaxCalculator, produced from a COBOL paragraph, with methods that reflect legacy arithmetic logic and structured output formatting.

Because two logical paths may reference a common COPYBOOK structure, segments can legitimately overlap. In some embodiments, during integration, the code-integration engine 120 maintains a hash map <segmentId, generatedArtifactHash>; identical hashes indicate duplicate POJOs or helper classes, which are emitted once and referenced by multiple call-sites. This approach can prevent type clashes while preserving one-to-many traceability back to source segments. For example, two independently generated segments—such as INIT-EMP and CALC-TAX—may reference the same COPYBOOK structure EMP-REC. During code generation each segment may emit an identical Java POJO named EmpRec. When the code-integration engine encounters the second copy, it may compute a content hash (for example, SHA-256) and detect that the artifact is byte-for-byte identical to the file already present in the build set. The integration engine may therefore retain the first instance of EmpRec.java, discard the duplicate, and record an entry in a provenance manifest that links both segment identifiers to the single retained file. As a result, the integrated project code may contain exactly one definition of the EmpRec class, eliminating symbol clashes while preserving traceability from each contributing segment to the shared artifact.

Generated Segment Documentation 186

In some embodiments, the generated segment documentation 186 includes narrative documentation produced by the document generation engine 122 in response to segment documentation prompts 174. The documentation may describe the functionality, inputs, outputs, and domain-specific context of the corresponding legacy segment, in a format appropriate for the selected user persona. For example, for the CALC-TAX segment, the generated segment documentation 186 may include a Markdown section titled "Tax Calculation Logic" that explains the payroll tax computation, lists referenced data fields, and includes a diagram or table aligning functions with BIAN domain roles. In some embodiments, the documentation may be formatted for integration into Confluence pages, PDF reports, or internal documentation systems. The segment documentation may also include embedded tags that link each narrative block to underlying AST nodes or COBOL line numbers, supporting traceability and review. Generating documentation in parallel with code may enable consistent, persona-driven outputs that facilitate onboarding, testing, compliance, and auditing without additional manual effort. FIG. 3B illustrates an example generated segment documentation 186, including a natural-language summary of the CALC-TAX logic tailored for a developer persona.

Code Integration Engine 120

In some embodiments, the code integration engine 120 is a module within the MCCS 104 that assembles the generated segment code 180 into an integrated project code 182 suitable for deployment. The code integration engine 120 may merge individual code files, resolve inter-segment dependencies, eliminate redundant artifacts, and generate build configurations or deployment metadata. For example, the code integration engine 120 may group related Java classes into a Spring Boot service, remove duplicate POJOs generated across multiple segments, and generate a Gradle or Maven build file along with Docker configuration files. In some embodiments, the code integration engine 120 may apply naming or packaging conventions, enforce architectural layering, or inject configuration properties based on project templates. The integration process may also generate logging, observability hooks, or runtime interface contracts. Treating integration as a deterministic, repeatable process may ensure consistency across transformed applications and may reduce manual stitching or rework often required in traditional refactoring workflows. The code integration engine 120 may, for example, be, or otherwise define, a software agent that autonomously coordinates these assembly tasks.

In some embodiments, runtime equivalence validation is provided. For example, a runtime-validation module may execute a representative test harness against both the original mainframe object module (COA 156) and the integrated project code 182. Field-level outputs may then be compared via a cryptographic digest, where mismatches trigger automatic regeneration of the affected segments with stricter prompt parameters. Such a validation loop may provide assurance of semantic equivalence and may be logged for audit or compliance reporting.

Document Integration Engine 124

In some embodiments, the document integration engine 124 is a module within the MCCS 104 that assembles the generated segment documentation 186 into integrated project documentation 190 suitable for review or publication. The document integration engine 124 may merge individual Markdown or structured outputs into a hierarchical document set, indexed by service domain, code module, or user persona. For example, the document integration engine 124 may assemble business analyst documentation, developer references, and compliance overviews into separate sections of a unified HTML document or Confluence page. In some embodiments, the document integration engine 124 may insert hyperlinks, diagrams, traceability maps, or navigational metadata to enhance readability and review. The document integration engine 124 may also support export into multiple formats such as PDF, JSON, or enterprise documentation platforms. Performing documentation integration alongside code assembly may allow the system to maintain synchronized views of application logic across roles, supporting maintainability, onboarding, and audit workflows. The document integration engine 124 may, for example, be, or otherwise define, a software agent that autonomously coordinates these merging and structuring operations.

Integrated Project Code 182

In some embodiments, the integrated project code 182 includes the fully assembled codebase output by the code integration engine 120, representing a deployable modernization of the legacy mainframe-source artifact. The integrated project code 182 may include application-layer classes, data access layers, service interfaces, and supporting build and deployment metadata. For example, the integrated project code 182 for the PAYROLL program may include a Spring Boot microservice containing tax-calculation logic, POJO classes reflecting COBOL data definitions, DAO classes corresponding to embedded SQL operations, and REST interfaces derived from CICS calls. In some embodiments, the integrated project code 182 may include test scaffolds, dependency manifests, and containerization descriptors (e.g., Dockerfiles, Helm charts) for CI/CD readiness. The integrated project code 182 may be exported to a source repository, code artifact store, or build pipeline for validation and deployment. The integrated project code 182 may be the output of one or more segment code components 180 integrated using deterministic post-processing rules to ensure structural consistency and traceability. FIG. 3B illustrates an example of generated segment code 180, which may form part of the integrated project code 182, including a Java service class derived from a COBOL paragraph.

Integrated Project Documentation 190

In some embodiments, the integrated project documentation 190 includes the combined documentation generated and assembled by the document generation engine 122 and the document integration engine 124. The integrated project documentation 190 may provide end-to-end visibility into the application logic, data structures, operational flows, and compliance annotations derived from the legacy source system. For example, the integrated project documentation 190 for the PAYROLL program may include structured persona-specific narratives, annotated diagrams, test coverage maps, and links to original COBOL source line references. In some embodiments, the integrated project documentation 190 may be exported in machine-readable formats for ingestion by enterprise documentation platforms or audit tools. Providing complete and aligned documentation alongside the transformed application code may improve maintainability, accelerate onboarding, and support regulatory or internal review processes. FIG. 3B illustrates an example of generated segment documentation 186, which may form part of the integrated project documentation 190, including Markdown-formatted narrative output.

Interface Engine 126

Figure 4:
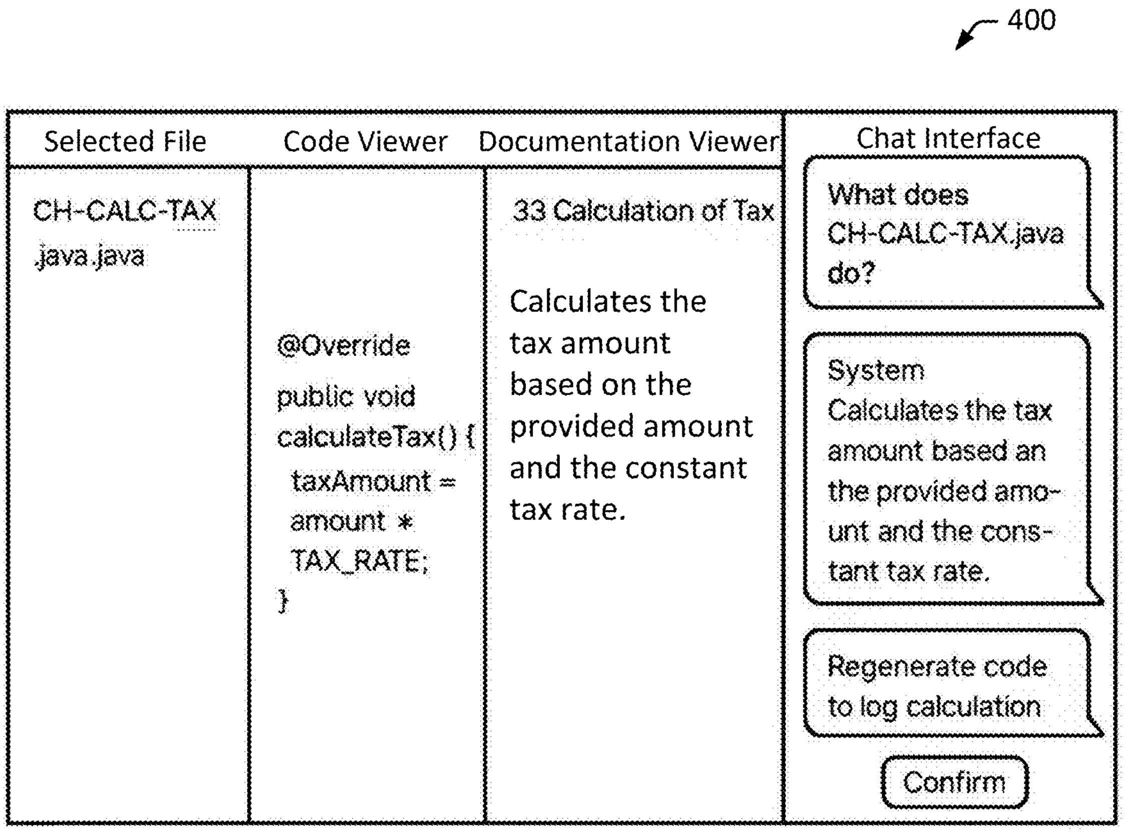
FIG. 4 is a diagram that illustrates an example user interface in accordance with one or more embodiments.

In some embodiments, the interface engine 126 is a module within the MCCS 104 that presents the integrated project code 182 and the integrated project documentation 190 to a user system 106 for interactive review and feedback. The interface engine 126 may include subcomponents for displaying, querying, and refining the generated outputs. The interface engine 126 may support interaction modes such as chat-based querying, side-by-side document/code browsing, and regeneration of selected segments based on user commands. For example, a developer reviewing the CALC-TAX module may use the interface engine 126 to view the generated Java method alongside its persona-specific documentation and trigger a prompt regeneration using a modified template. In some embodiments, the interface engine 126 may also maintain state across user sessions, record feedback actions, and log traceability data for compliance auditing. FIG. 4 illustrates an example interactive interface 400, which may be generated by interface engine 126, including a code viewer, documentation viewer, and chat-feedback region. In some embodiments, selected components of the interface engine 126, such as the chat engine 128 or doc/code viewer 130, may execute on the user system 106 as part of a distributed client-server architecture.

Chat Engine 128

In some embodiments, the chat engine 128 is a subcomponent of the interface engine 126 that provides a natural-language interface for interacting with the integrated project code 182 and the integrated project documentation 190. The chat engine 128 may allow users to ask questions, request explanations, and issue regeneration commands using free-form input. For example, a user may enter "What are the external dependencies for the TaxCalculationService?" and receive a response generated by querying metadata associated with the CAA-AST 164 and the corresponding segment documentation 186. In some embodiments, the chat engine 128 may be backed by a lightweight language model or heuristic responder and may offer predefined query types or action templates. The chat engine 128 may, for example, be, or otherwise define, a software agent that can autonomously operate on incoming data, relying on distributing tasks to other processing engines, such as sub-agents.

In some embodiments, the chat engine 128 enables retrieval-augmented interaction by vectorizing the segment documentation and constructing query-specific prompt contexts for a large language model. The chat engine 128 may compute vector embeddings for each segment of the integrated project documentation 190 using a transformer-based encoder model. These embeddings may be stored in an approximate-nearest-neighbor (ANN) index that allows efficient retrieval of semantically relevant content. When a user submits a natural-language query via the chat interface, the chat engine 128 may compute an embedding for the query, retrieve the top-k most similar documentation chunks from the index, and assemble a prompt context including: (i) the retrieved documentation text, (ii) any referenced lines of integrated project code 182, and (iii) associated segment identifiers 168. This prompt context may be passed along with the user query to a selected LLM from the model library 144. The chat engine 128 may stream the model's response back through the interface while maintaining an audit trail of retrieved chunks and response metadata. This process enables precise, segment-aware interactions using project-specific documentation rather than relying on general model memory, thereby improving factual accuracy and response consistency.

In some embodiments, the chat engine 128 provides a retrieval-augmented question-answering interface. When the integrated project documentation 190 is finalized, the chat engine 128 may compute language-model embeddings for each documentation segment (or "chunk") (e.g., using a Sentence-BERT embedding model) and store the resulting vectors in an approximate-nearest-neighbor index. At query time the chat engine 128 may embed the user's chat question, retrieve the top-k semantically closest chunks, and construct a context window that includes: (i) the retrieved documentation passages, (ii) any referenced lines of integrated project code 182, and (iii) provenance pointers back to segment identifiers 168. This context may be appended to the user query and routed to a lightweight chat completion model selected from the model library 144. The chat engine 128 may stream the model's response back to the user via the interface, and log the retrieval set for audit purposes. Because the chat engine 128 may rely on vectorized, compiler-derived documentation rather than raw COBOL, it may answer project-specific questions with higher factual accuracy and lower hallucination rates.

For example, a developer reviewing the CALC-TAX segment may submit a query such as "What are the input fields used in tax calculation?" The chat engine 128 may embed the query and retrieve semantically similar documentation chunks—such as the narrative generated for the CALC-TAX segment—whose embeddings are nearest to the query vector. The retrieved chunks may include Markdown text describing input fields (e.g., EMP-INCOME, TAX-CODE), their source line numbers, and their corresponding AST nodes. The chat engine 128 may construct a prompt context including this content, append the original user query, and apply it to a selected LLM from the model library 144. The resulting answer may be streamed back to the user, including citations to the relevant code and documentation segments, enabling a natural-language interface for domain-specific review. This retrieval-augmented approach allows the chat engine to respond with high factual accuracy using project-specific, compiler-derived documentation—without requiring the model to memorize the legacy codebase or hallucinate missing logic.

In some embodiments, the chat interface operates using an agentic retrieval-augmented generation (RAG) technique that enables accurate, context-aware responses to user queries. For example, when a user submits a natural-language question, the system retrieves relevant documentation and code chunks from a vectorized index and synthesizes a response using a selected large language model. In some embodiments, component-level code artifacts and corresponding documentation—such as those generated for individual segments—are transformed into vector embeddings using a text encoder model. These embeddings may be stored in a vector database or approximate nearest-neighbor (ANN) index that supports high-speed semantic search. In some embodiments, in response to a user query, the system computes an embedding for the input question and queries the vector database to retrieve the most semantically similar chunks. The retrieved chunks may be re-ranked using metadata-aware scoring functions that account for segment relevance, user role, or recency of generation. In some embodiments, the chat engine constructs a prompt context using the top-ranked chunks, including both source-level logic (e.g., Java methods) and corresponding natural-language documentation. This context is appended to the user's query and passed to a selected LLM to generate a response that reflects the most relevant project artifacts. This agentic RAG workflow may enable the system to answer detailed technical or functional questions using project-specific context rather than relying on general model memory. For example, a developer may ask "Which service modifies the tax rate?" and receive an answer derived directly from indexed transformation artifacts, improving factual precision and traceability.

Doc/Code Viewer 130

In some embodiments, the doc/code viewer 130 is a subcomponent of the interface engine 126 adapted to display the integrated project code 182 and integrated project documentation 190 in a coordinated interface. The doc/code viewer 130 may allow a user to navigate by file, function, persona, or BIAN domain, and may support inline comparison between legacy source lines and modernized outputs. For example, the doc/code viewer 130 may show the original COBOL paragraph for CALC-TAX, the corresponding Java method, and a BIAN-tagged business description in adjacent panes. In some embodiments, the doc/code viewer 130 may support hyperlink navigation, synchronized scrolling, and filtering by segment label or role.

Feedback Engine 132

In some embodiments, the feedback engine 132 is a subcomponent of the interface engine 126 adapted to receive user feedback and trigger reprocessing of selected segments. The feedback engine 132 may capture user actions such as prompt modifications, model selection overrides, or acceptance/rejection of generated outputs. For example, a user 108 may, via their system 106, modify the prompt template for a "Transactional-API Call" segment and request regeneration using a different LLM 146 from the model library 144. In some embodiments, the feedback engine 132 may maintain an audit log of feedback actions and invoke the prompt generation engine 114, code generation engine 118, or document generation engine 122 as appropriate. The feedback engine 132 may identify which generation module to re-invoke based on the type of user input—for example, feedback concerning unclear technical logic may trigger regeneration of segment code, while a request for expanded explanation may trigger regeneration of segment documentation. For example, a compliance officer may flag missing audit annotations in the documentation of a CICS transaction segment, prompting the feedback engine 132 to re-invoke the document generation engine 122 with an updated template focused on exception-handling flows. Supporting real-time feedback and selective regeneration may allow the system to adapt outputs to user preferences without requiring full pipeline re-execution.

Code Migration Engine 133

In some embodiments, the MCCS 104 further includes a code migration engine 133. The code migration engine 133 may receive the integrated project code 182 and, responsive to project-level migration policies, automatically produce one or more deployment artifacts that move the modernized application into a target runtime. Examples include: (i) generating Kubernetes Helm charts for containerized microservices, (ii) producing Liquibase or Flyway migration scripts that create relational schemas corresponding to transformed VSAM or DB2 tables, and (iii) emitting Infrastructure-as-Code templates (e.g., Terraform or AWS CloudFormation) that provision cloud resources. The engine may evaluate dependency metadata retained from segment identifiers to ensure that every shared artifact—such as the EmpRec POJO described above—maps to exactly one deployed component, thereby avoiding class-loader conflicts during runtime migration. The engine may also invoke a language-specific transpiler or byte-code injector if the target platform requires AOT compilation or GraalVM native-image builds. The code migration engine 133 may, for example, be, or otherwise define, a software agent that can autonomously operate on incoming data, relying on the distribution of tasks to other processing engines, such as sub-agents.

In some embodiments, the code migration engine 133 transforms the integrated project code 182 into deployment-ready artifacts by applying project-specific migration policies. The engine may first retrieve a migration policy 148, which defines one or more build configurations, containerization strategies, runtime targets, or CI/CD workflows. Based on the migration policy, the engine may generate infrastructure templates, build scripts, deployment descriptors, and service definitions appropriate for the selected target environment. Each output artifact may be tagged or linked to the segment identifiers 168 from which it was derived. These artifacts may then be bundled into a deployment package, which can be deployed to container orchestration platforms (e.g., Kubernetes), serverless environments, or local execution contexts.

For example, if the CALC-TAX segment results in a Java class named TaxCalculator, and the migration policy targets a Kubernetes environment, the code migration engine 133 may generate a Dockerfile that compiles the class into a container image, along with a Helm chart defining service deployment parameters. It may also generate a GitHub Actions workflow that builds and publishes the image to a container registry. The engine may associate the TaxCalculator image and related deployment descriptors with the segment identifier corresponding to CALC-TAX. In another example, if the target environment is a serverless function, the engine may wrap the TaxCalculator class in an AWS Lambda handler and emit the required deployment metadata. These deployment bundles enable the transformed code to be executed in modern runtime environments with minimal manual configuration.

In some embodiments, data migration is performed as a precursor to code deployment, such as when the legacy application relies on mainframe-resident data stores or encoded file systems. Data migration may include schema conversion, data reformatting, and pipeline construction for ingestion into the target environment.

In some embodiments, when the legacy system uses VSAM datasets, the system includes a data architect agent that generates relational database schemas compliant with enterprise standards. For example, the agent may create normalized RDBMS tables that reflect the structure and constraints of the original VSAM records. Extract-transform-load (ETL) pipelines may be generated to migrate historical data from the source mainframe datasets into the transformed RDBMS format.

In some embodiments, the system supports transformation of inbound EBCDIC flat files into modern file formats. For example, character-encoded input files may be converted to ASCII-based CSV or JSON formats using schema-aware conversion logic. This conversion may be applied to batch interfaces, intermediate staging files, or integration artifacts as part of the overall deployment pipeline.

In some embodiments, the system further supports automated deployment to a designated platform-as-a-service (PaaS) environment. For example, deployment may target AppEngine, a company on-premises PaaS offering. In such cases, an AppEngine agent may be used to generate deployment-specific artifacts.

In some embodiments, the AppEngine agent creates one or more of: containerization artifacts (e.g., Dockerfiles), assembly descriptors, platform registration files, and continuous integration/continuous deployment (CI/CD) pipelines. These artifacts may be tailored to the AppEngine runtime model and aligned with enterprise deployment conventions.

By integrating data migration and PaaS deployment into the code migration process, the system supports end-to-end modernization workflows that span both application and data tiers. This approach may reduce manual overhead, accelerates transition timelines, and improves alignment between transformed application logic and underlying data infrastructure.

Migration Policy 148

In some embodiments, the migration policy 148 includes one or more declarative configuration files—such as YAML or JSON documents—that describe how the code-migration engine 133 packages and deploys the integrated project code 182. Each policy file may specify target-environment attributes (for example, Kubernetes namespace, JVM version, or serverless provider), build directives (such as multi-stage Dockerfile templates or GraalVM native-image flags), and post-deployment hooks (for instance, Liquibase scripts that migrate relational schemas generated from legacy VSAM files). Policies may be versioned and keyed by a policy identifier so that a given migration run can be reproduced or rolled back. The store may also retain template fragments—Helm charts, Terraform modules, or CI/CD workflows—that the code-migration engine injects into the final deployment bundle, thereby allowing enterprises to standardize migration outputs across multiple projects while still accommodating environment-specific requirements.

The disclosed system provides an end-to-end transformation pipeline for converting legacy mainframe-source artifacts into modern, deployable application code and role-specific documentation. The system leverages compiler-generated analysis artifacts (CAA) to construct a canonical abstract syntax tree (CAA-AST), which is segmented into dependency-closed logical units. For each segment, the system generates tailored prompts that are processed by large language models (LLMs) selected from a configurable model library. The resulting code and documentation outputs are assembled into integrated project artifacts and presented to users through an interactive interface that supports chat-based queries, side-by-side inspection, and selective regeneration based on feedback.

The disclosed system and associated methods may enable the automated transformation of legacy mainframe source artifacts—such as COBOL programs—into modernized, deployable Java code with corresponding role-specific documentation. For example, a legacy COBOL paragraph like CALC-TAX that computes payroll deductions may be compiled to emit a SYSADATA file, which is converted into an abstract syntax tree (CAA-AST). The system segments the AST into a self-contained unit, classifies it using predefined labels, and generates tailored prompts. A large language model then produces a corresponding Java class (e.g., TaxCalculator) along with Markdown documentation describing its business logic. The resulting artifacts are deduplicated, integrated into a deployable codebase, and processed using migration policies to generate Helm charts, Dockerfiles, and infrastructure templates suitable for cloud deployment. This workflow provides an end-to-end, compiler-guided transformation that reduces SME effort, preserves traceability, and yields production-ready outputs executable in modern enterprise environments.

This architecture may improve the accuracy, efficiency, and scalability of legacy modernization by, for example: eliminating the need for handwritten parsers via use of compiler-resolved SYSADATA; aligning code generation and documentation via shared AST and prompt structures; reducing hallucination and drift through deterministic segmentation and template-driven prompt construction; enabling role-specific outputs tailored to developers, analysts, testers, and compliance personnel; supporting modular feedback and regeneration, avoiding full pipeline re-execution; and providing auditable traceability between legacy inputs and generated artifacts. The system may also leverage a code migration engine 133 and migration policies 148 to automate deployment of the integrated project code 182 into target runtimes. These capabilities may offer concrete improvements in transformation throughput, code quality, maintainability, and SME workload reduction—addressing both the technical and organizational challenges of mainframe modernization at enterprise scale.

Figure 2:
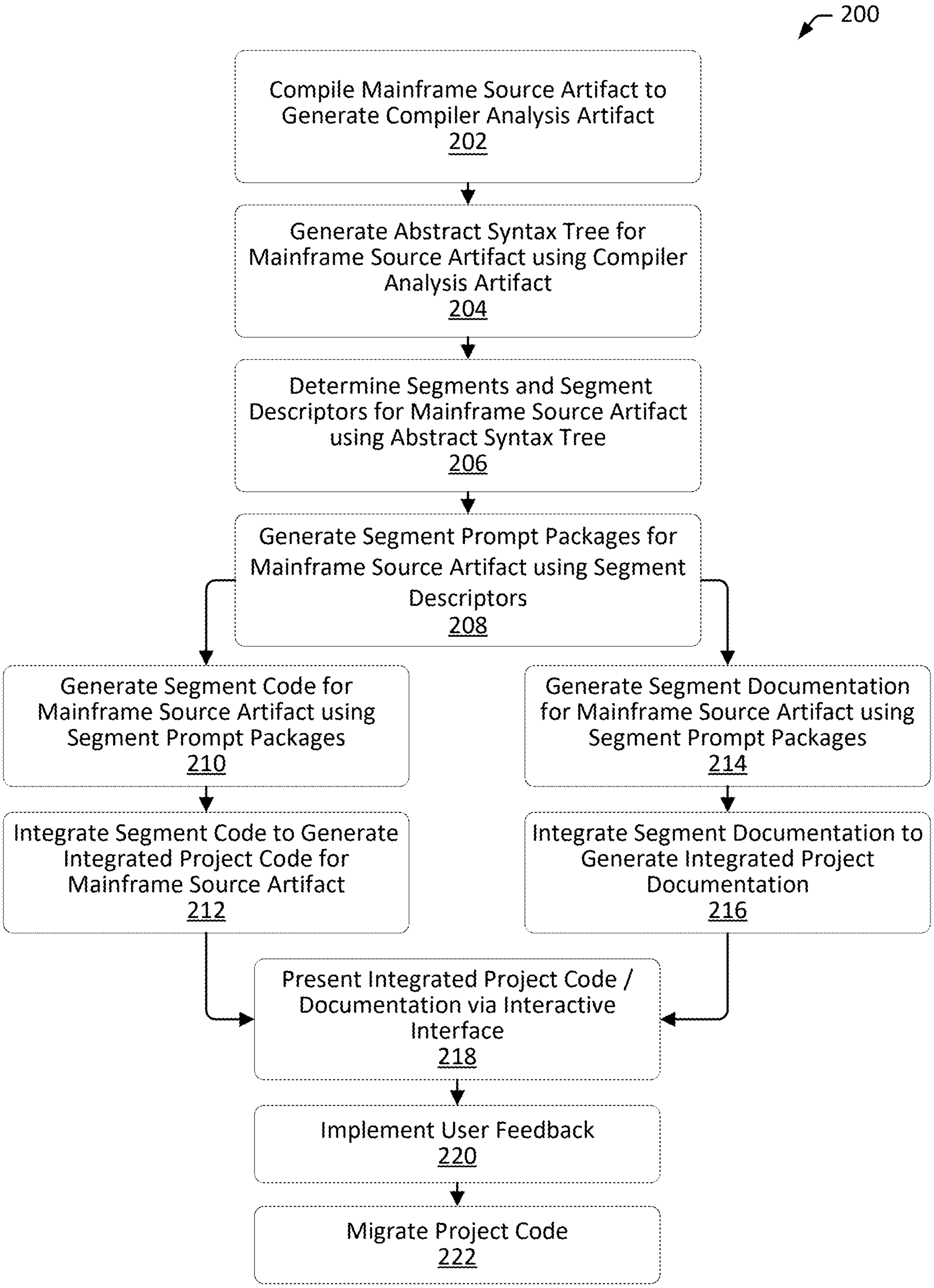
FIG. 2 is a flow diagram that illustrates a method for transforming legacy mainframe source artifacts into integrated project code and documentation in accordance with one or more embodiments.

FIG. 2 is a flow diagram that illustrates a method 200 for transforming legacy mainframe source artifacts into integrated project code and documentation in accordance with one or more embodiments. Some or all of the procedural elements of method 200 may be performed, for example, by one or more entities of system 102 or another entity of environment 100. For example, some or all of the operations of method 200 may be performed by MCCS 104, a subsystem/module/engine thereof, mainframe computing system 102, compiler 152, the user 108 or the user system 106.

In some embodiments, method 200 includes compiling mainframe source artifact to generate compiler output (block 202). This may include compiling a legacy mainframe-source artifact (MSA) with a mainframe compiler to generate a compiler object artifact (COA) and a compiler analysis artifact (CAA). For example, the PAYROLL COBOL program may be compiled by mainframe compiler 152 to produce a compiler object artifact (COA) 156 and a compiler analysis artifact (CAA) 158, as described here.

In some embodiments, method 200 includes generating abstract syntax tree for mainframe source artifact using compiler analysis artifact (block 204). This may include parsing the compiler analysis artifact to create a structured, machine-readable representation of the mainframe source artifact in the form of an abstract syntax tree (AST). For example, AST generation engine 110 may parse CAA 158 (e.g., a SYSADATA file) for the PAYROLL program to generate CAA-XML 162 and convert that into CAA-AST 164, as described here.

In some embodiments, method 200 includes determining segments and segment descriptors for mainframe source artifact using abstract syntax tree (block 206). This may include analyzing the abstract syntax tree to identify dependency-closed logical code segments (or "chunks") and assigning each segment a unique segment identifier and one or more segment labels. For example, segmentation engine 112 may identify the CALC-TAX paragraph and its dependencies in CAA-AST 164, assign a segment identifier 168, and apply labels 170 based on data access or control-flow roles, as described here. This may be repeated in a similar manner for each of the other segments.

In some embodiments, method 200 includes generating segment prompt packages for mainframe source artifact using segment descriptors (block 208). This may include using segment descriptors to construct segment prompt packages that include a segment code prompt and a segment documentation prompt. For example, prompt generation engine 114 may construct segment prompt package 172 for the CALC-TAX segment using segment label 170 and a developer persona to retrieve and populate prompt templates 142, as described here. This may be repeated in a similar manner for each of the other segments.

In some embodiments, method 200 includes generating segment code for mainframe source artifact using segment prompt packages (block 210). This may include applying one or more large language models to segment code prompts in the segment prompt packages to generate target-language source code. For example, code generation engine 118 may apply a selected LLM 146 from model library 144 to generate segment code 180 for the CALC-TAX segment in the form of a Java method, as described here. This may be repeated in a similar manner for each of the other segments.

In some embodiments, method 200 includes integrating segment code to generate integrated project code for mainframe source artifact (block 212). This may include deduplicating, structuring, and combining segment code artifacts into an integrated and deployable codebase. For example, code integration engine 120 may merge segment code 180 for the segments, including that for the CALC-TAX segment, into integrated project code 182 and generate associated build and containerization files, as described here.

In some embodiments, method 200 includes generating segment documentation for mainframe source artifact using segment prompt packages (block 214). This may include applying one or more large language models to segment documentation prompts in the segment prompt packages to generate role-specific narrative content. For example, document generation engine 122 may generate segment documentation 186 for the CALC-TAX segment using a compliance-oriented template and an LLM 146 from model library 144, as described here. This may be repeated in a similar manner for each of the other segments.

In some embodiments, method 200 includes integrating segment documentation to generate integrated project documentation (block 216). This may include structuring and combining segment-level documentation into a persona-specific or module-aligned documentation set. For example, document integration engine 124 may compile multiple instances of segment documentation 186, including that for the CALC-TAX segment, into integrated project documentation 190, organized by function and user role, as described here.

In some embodiments, method 200 includes presenting integrated project code/documentation via interactive interface (block 218). This may include rendering the generated code and documentation in an interactive user interface with navigation, querying, and side-by-side viewing functionality. For example, interface engine 126 may display integrated project code 182 and integrated project documentation 190 in doc/code viewer 130, enable chat interaction via chat engine 128, and enable receipt or processing of user feedback via feedback engine 132 as described here. In some embodiments, selected components of the interface engine 126, such as the chat engine 128 or doc/code viewer 130, may execute on the user system 106 as part of a distributed client-server architecture.

In some embodiments, method 200 includes implementing user feedback (block 220). This may include processing user input to trigger selective regeneration of one or more segments using alternate prompt templates or models. For example, feedback engine 132 may receive feedback on the CALC-TAX segment and instruct prompt generation engine 114 to revise a prompt, reemploying document generation engine 122 or code generation engine 118 to regenerate documentation or code for the CALC-TAX segment, as described here.

In some embodiments, method 200 includes migrating the integrated project code (block 222). This may include transforming the integrated project code into deployment-ready artifacts suitable for execution in a target environment, such as a cloud-native platform, container orchestration system, or serverless runtime. Migration may entail applying deployment configuration rules, packaging build outputs, generating supporting infrastructure templates, and associating the resulting artifacts with their originating logical segments to preserve traceability. For example, the code migration engine 133 may apply a selected portion of the migration policy 148 to the integrated project code 182. If the policy targets a Kubernetes environment, the engine may generate Dockerfiles, multi-stage build scripts, Helm charts, and a GitHub Actions workflow that builds and pushes container images. If the policy targets a serverless platform, the engine may wrap selected Java methods in a lightweight function handler and emit provider-specific deployment descriptors. The engine may write the resulting artifacts to a deployment package and record a mapping from each segment identifier 168 to the artifact(s) in which that segment's logic is deployed, thereby preserving traceability after migration. The generated Java code, once packaged by the code migration engine 133, may be deployed and executed on a cloud-native runtime, container orchestration platform (e.g., Kubernetes), or a serverless infrastructure supporting Java execution environments-including local or remote execution on a user system 106. For example, in some embodiments, the integrated project code 182 may be deployed to a local runtime environment on user system 106, such as a Java virtual machine (JVM) running on a developer workstation, enabling immediate execution and validation without requiring centralized infrastructure.

The migration step may complete the transformation pipeline by producing executable deployment artifacts that can be directly run in production environments without further manual refactoring or translation. These artifacts may include structured container descriptors, infrastructure automation templates, and compiled native binaries-all derived automatically from legacy mainframe source artifacts. By integrating code transformation with deployment automation, the system provides a concrete, practical application: it enables enterprises to replace aging, monolithic mainframe programs with modular, cloud-native services that are maintainable, testable, and deployable using modern DevOps toolchains. This approach improves overall computer system functionality by eliminating brittle parsing logic, reducing manual deployment error, and enabling traceable, repeatable modernization across large-scale codebases-thereby yielding tangible improvements in efficiency, reliability, and scalability in enterprise IT environments.

As described above, method 200 may provide a structured and repeatable transformation pipeline for converting legacy mainframe source artifacts into modernized project code and documentation using compiler-derived artifacts, abstract syntax tree segmentation, and large language model inference. The method may improve transformation accuracy and consistency by eliminating reliance on grammar-based parsers and enabling deterministic, context-complete code generation. By aligning documentation and code generation within a shared pipeline, and incorporating persona-specific prompts and user feedback mechanisms, the method may further reduce reliance on subject-matter experts, increase transformation throughput, and enhance maintainability of the resulting system artifacts.

Figure 5:
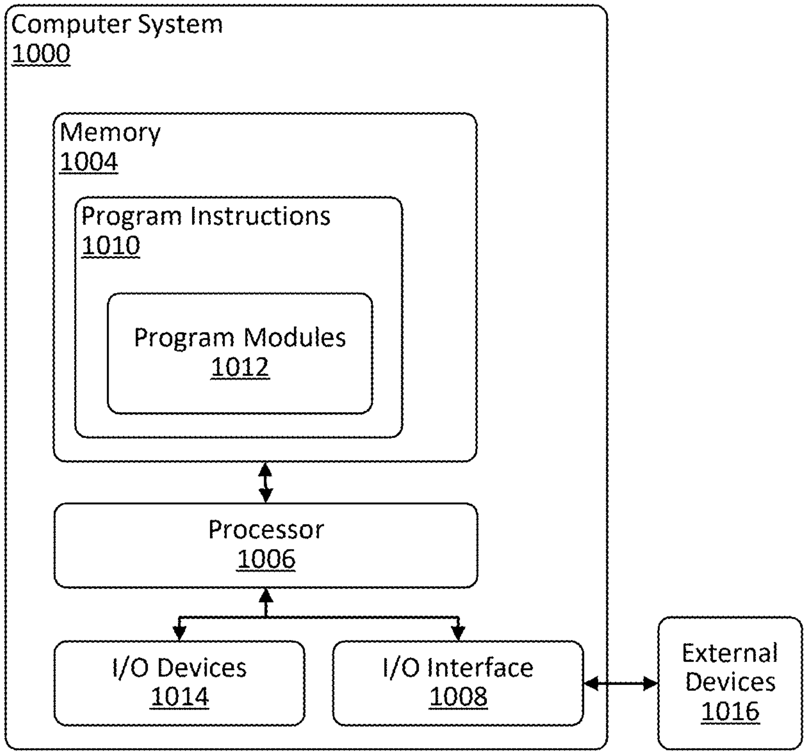
FIG. 5 is a block diagram that illustrates a computing system suitable for implementing one or more modules described herein, in accordance with one or more embodiments.

FIG. 5 is a diagram that illustrates an example computer system (or "system") 1000 in accordance with one or more embodiments. The system 1000 may include a memory 1004, a processor 1006, and an input/output (I/O) interface 1008. The memory 1004 may include non-volatile memory (e.g., flash memory, read-only memory (ROM), programmable ROM (PROM), erasable PROM (EPROM), electrically erasable PROM (EEPROM)), volatile memory (e.g., random access memory (RAM), static RAM (SRAM), synchronous dynamic RAM (SDRAM)), or bulk storage (e.g., CD-ROM, DVD-ROM, or hard drives). The memory 1004 may include a non-transitory computer-readable storage medium having program instructions 1010 stored thereon. The program instructions 1010 may include one or more program modules 1012 that are executable by the processor 1006 to cause the system 1000 to perform one or more functional operations described herein, such as those associated with components of the mainframe code conversion system (MCCS 104), including any of AST generation engine 110, segmentation engine 112, prompt generation engine 114, code generation engine 118, document generation engine 122, code integration engine 120, document integration engine 124, interface engine 126, code migration engine 133, or method 200. In some embodiments, deployment artifacts generated by the MCCS 104 may also be executed locally on the system 1000 (e.g., via a Java virtual machine), particularly when user system 106 is implemented as a workstation or developer terminal.

The processor 1006 may include one or more processors capable of executing program instructions (e.g., program modules 1012) to perform logical, arithmetic, or I/O operations. The processor 1006 may include a single processing unit or multiple processing cores, each of which may include one or more logical or physical processors. In some embodiments, parallel processing may be used to perform MCCS operations concurrently across multiple segments or submodules, for example, by distributing segment-level prompt generation or code inference tasks across cores.

The I/O interface 1008 may provide an interface for communication with one or more I/O devices 1014, such as a keyboard, mouse, touchscreen, or electronic display configured to present a graphical user interface (GUI). The I/O devices 1014 may include one or more user-input devices and may be connected to the I/O interface 1008 via wired (e.g., Ethernet) or wireless (e.g., Wi-Fi, Bluetooth) connections. Additionally, the I/O interface 1008 may enable communication with external systems 1016, such as remote servers, cloud services, or networked development environments. In some embodiments, the I/O interface 1008 may include a transceiver or antenna to support wireless communication with external data sources or client devices, enabling remote execution or review of the MCCS workflow and outputs.

Further modifications and alternative embodiments of various aspects of the disclosure will be apparent to those skilled in the art in view of this description. Accordingly, this description is to be construed as illustrative only and is intended to teach the general manner of carrying out the embodiments. The forms of the embodiments shown and described here are examples only. Elements and materials may be substituted for those illustrated and described here; parts and processes may be reversed, combined, omitted, or modified; and certain features may be utilized independently, all as would be apparent to one skilled in the art. The order of operations may vary, and portions of the described processes may be implemented in software, hardware, or a combination thereof, including by one or more of the processors, modules, or applications described in this disclosure.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the context clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and at least in part on data B, unless the context clearly indicates otherwise. As used throughout this application, the term "from" does not limit the associated operation to being directly from. Thus, for example, receiving an item "from" an entity may include receiving the item directly from the entity or indirectly from the entity (e.g., by way of an intermediary entity). As used throughout this application, the term "to" does not limit the associated operation to being directly to. Thus, for example, transmitting an item "to" an entity may include transmitting the item directly to the entity or indirectly to the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special-purpose computer or a similar special-purpose electronic processing/computing device. In the context of this specification, a special-purpose computer or similar special-purpose electronic processing/computing device is capable of manipulating or transforming signals, typically represented as physical, electronic, or magnetic quantities within memories, registers, or other information storage devices, transmission devices, or display devices of the special-purpose computer or similar special-purpose electronic processing/computing device. Headings and section titles used throughout this disclosure are provided for organizational clarity and convenience of reference only and are not intended to limit the scope of the disclosure or the claimed invention In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading by virtue of the way in which those terms are used in other materials incorporated by reference.

The techniques described may be further clarified and understood by the following listing of example embodiments:

1. A computer-implemented method for transforming a mainframe-source artifact into integrated project code and corresponding project documentation, the method comprising:

compiling, with a mainframe compiler, a mainframe-source artifact (MSA) to generate a compiler-analysis artifact (CAA);

generating, from the CAA, an abstract-syntax-tree (CAA-AST);

identifying, based on the CAA-AST, a plurality of logical segments of the MSA;

for each logical segment:

determining a segment descriptor comprising a segment identifier and a segment label;

generating a segment-prompt package comprising a segment-documentation prompt and a segment-code prompt;

generating, by applying the segment-documentation prompt to a first large-language model (LLM), segment documentation; and generating, by applying the segment-code prompt to a second LLM, segment code;

integrating the segment documentation of the plurality of logical segments to form integrated project documentation for the MSA;

integrating the segment code of the plurality of logical segments to form integrated project code for the MSA; and presenting, via a user-interface engine, the integrated project documentation and the integrated project code.

2. The method of embodiment 1, wherein the CAA comprises a SYSADATA file emitted by the mainframe compiler.

3. The method of any one of embodiments 1-2, wherein the CAA comprises a compiler-generated binary file that encodes a parse-tree representation of the mainframe-source artifact and symbol-table metadata to map each node of the parse tree to a corresponding data definition or procedure element.

4. The method of any one of embodiments 1-3, wherein the CAA-AST comprises a hierarchical graph data structure whose nodes represent compiler-resolved program elements and whose edges encode control-flow and data-reference relationships among those nodes.

5. The method of any one of embodiments 1-4, wherein identifying the plurality of logical segments comprises traversing dependency links in the CAA-AST until a dependency-closure condition is met, thereby ensuring that each logical segment contains every data structure and external operation referenced by that segment.

6. The method of any one of embodiments 1-5, wherein:

the segment identifier is a deterministic hash calculated from node identifiers included in the logical segment; and the segment label is selected from a predefined segment-label library that includes at least: Data-Structure Definition, Persistent-Storage Definition, Relational-Query Operation, Transactional-API Call, and Control-Flow Logic.

7. The method of any one of embodiments 1-6, wherein generating the segment-prompt package further comprises deriving at least one of the segment-documentation prompt or the segment-code prompt from a prompt template stored in a template library and selected according to the segment label.

8. The method of any one of embodiments 1-7, wherein selecting the first LLM comprises selecting, from a model library, a model corresponding to a target user role for the documentation, or selecting the second LLM comprises selecting, from the model library, a model having a code-generation capability corresponding to a target programming language of the segment code.

9. The method of any one of embodiments 1-8, wherein the user-interface engine comprises:

a chat interface operable to receive natural-language queries and regeneration commands; and a viewer operable to display the integrated project documentation and the integrated project code in a coordinated presentation.

10. A system comprising:

a processor; and non-transitory computer readable storage medium comprising program instructions stored thereon that are executable by a processor to cause the following operations for transforming a mainframe-source artifact into integrated project code and corresponding project documentation:

compiling, with a mainframe compiler, a mainframe-source artifact (MSA) to generate a compiler-analysis artifact (CAA);

generating, from the CAA, an abstract-syntax-tree (CAA-AST);

identifying, based on the CAA-AST, a plurality of logical segments of the MSA;

for each logical segment:

determining a segment descriptor comprising a segment identifier and a segment label;

generating a segment-prompt package comprising a segment-documentation prompt and a segment-code prompt;

generating, by applying the segment-documentation prompt to a first large-language model (LLM), segment documentation; and generating, by applying the segment-code prompt to a second LLM, segment code;

integrating the segment documentation of the plurality of logical segments to form integrated project documentation for the MSA;

integrating the segment code of the plurality of logical segments to form integrated project code for the MSA; and presenting, via a user-interface engine, the integrated project documentation and the integrated project code.

11. The system of embodiment 10, wherein the CAA comprises a SYSADATA file emitted by the mainframe compiler.

12. The system of any one of embodiments 10-11, wherein the CAA comprises a compiler-generated binary file that encodes a parse-tree representation of the mainframe-source artifact and symbol-table metadata to map each node of the parse tree to a corresponding data definition or procedure element.

13. The system of any one of embodiments 10-12, wherein the CAA-AST comprises a hierarchical graph data structure whose nodes represent compiler-resolved program elements and whose edges encode control-flow and data-reference relationships among those nodes.

14. The system of any one of embodiments 10-13, wherein identifying the plurality of logical segments comprises traversing dependency links in the CAA-AST until a dependency-closure condition is met, thereby ensuring that each logical segment contains every data structure and external operation referenced by that segment.

15. The system of any one of embodiments 10-14, wherein:

the segment identifier is a deterministic hash calculated from node identifiers included in the logical segment; and the segment label is selected from a predefined segment-label library that includes at least: Data-Structure Definition, Persistent-Storage Definition, Relational-Query Operation, Transactional-API Call, and Control-Flow Logic.

16. The system of any one of embodiments 10-15, wherein generating the segment-prompt package further comprises deriving at least one of the segment-documentation prompt or the segment-code prompt from a prompt template stored in a template library and selected according to the segment label.

17. The system of any one of embodiments 10-16, wherein selecting the first LLM comprises selecting, from a model library, a model corresponding to a target user role for the documentation, or selecting the second LLM comprises selecting, from the model library, a model having a code-generation capability corresponding to a target programming language of the segment code.

18. The system of any one of embodiments 10-17, wherein the user-interface engine comprises:

a chat interface operable to receive natural-language queries and regeneration commands; and a viewer operable to display the integrated project documentation and the integrated project code in a coordinated presentation.

19. Non-transitory computer readable storage medium comprising program instructions stored thereon that are executable by a processor to cause the method operations of any one of embodiments 1-9.

20. A computer-implemented method for generating segment-specific documentation for a legacy mainframe-source artifact, the method comprising.

receiving, from a compiler, a compiler-analysis artifact (CAA) generated by compiling a mainframe-source artifact (MSA);

generating, from the CAA, an abstract-syntax-tree (CAA-AST)

identifying, based on the CAA-AST, a plurality of logical segments of the MSA;

for each logical segment:

determining a segment descriptor comprising a segment identifier and a segment label;

generating a segment-documentation prompt based on the segment descriptor; and generating, by applying the segment-documentation prompt to a large-language model (LLM), segment documentation; and integrating the segment documentation of the plurality of logical segments to form integrated project documentation for the MSA.

21. The method of embodiment 20, wherein the CAA comprises a SYSADATA file emitted by a mainframe COBOL compiler.

22. The method of any one of embodiments 20-21, wherein the segment-documentation prompt is generated from a prompt template selected from a template library based on the segment label and a target user role.

23. The method of any one of embodiments 20-22, wherein the segment documentation is formatted in a structured markup format, and comprises:

a narrative description of the segment's functionality;

an enumeration of input and output fields; and cross-references to corresponding CAA-AST nodes.

24. The method of any one of embodiments 20-23, wherein integrating the segment documentation comprises organizing the segment documentation according to a documentation policy corresponding to a user persona selected from a group comprising: business analyst, developer, tester, and compliance reviewer.

25. The method of any one of embodiments 20-24, further comprising generating segment code for the plurality of logical segments by:

generating a segment-code prompt for each logical segment;

applying the segment-code prompt to a second LLM to generate segment code; and integrating the segment code into integrated project code for the MSA.

26. The method of any one of embodiments 20-25, wherein the segment documentation is generated by a document-generation engine implemented as a software agent.

27. A system comprising:

a processor; and non-transitory computer readable storage medium comprising program instructions stored thereon that are executable by a processor to cause the following operations for generating segment-specific documentation for a legacy mainframe-source artifact:

receiving, from a compiler, a compiler-analysis artifact (CAA) generated by compiling a mainframe-source artifact (MSA);

generating, from the CAA, an abstract-syntax-tree (CAA-AST);

identifying, based on the CAA-AST, a plurality of logical segments of the MSA;

for each logical segment:

determining a segment descriptor comprising a segment identifier and a segment label;

generating a segment-documentation prompt based on the segment descriptor; and generating, by applying the segment-documentation prompt to a large-language model (LLM), segment documentation; and integrating the segment documentation of the plurality of logical segments to form integrated project documentation for the MSA.

28. The system of embodiment 27, wherein the CAA comprises a SYSADATA file emitted by a mainframe COBOL compiler.

29. The system of any one of embodiments 27-28, wherein the segment-documentation prompt is generated from a prompt template selected from a template library based on the segment label and a target user role.

30. The system of any one of embodiments 27-29, wherein the segment documentation is formatted in a structured markup format, and comprises:

a narrative description of the segment's functionality;
an enumeration of input and output fields; and
cross-references to corresponding CAA-AST nodes.

31. The system of any one of embodiments 27-30, wherein integrating the segment documentation comprises organizing the segment documentation according to a documentation policy corresponding to a user persona selected from a group comprising: business analyst, developer, tester, and compliance reviewer.

32. The system of any one of embodiments 27-31, the operations further comprising generating segment code for the plurality of logical segments by:

generating a segment-code prompt for each logical segment;
applying the segment-code prompt to a second LLM to generate segment code; and
integrating the segment code into integrated project code for the MSA.

33. The system of any one of embodiments 27-32, wherein the segment documentation is generated by a document-generation engine implemented as a software agent.

34. Non-transitory computer readable storage medium comprising program instructions stored thereon that are executable by a processor to cause the method operations of any one of embodiments 20-26.

35. A computer-implemented method for generating segment-specific source code for a legacy mainframe-source artifact, the method comprising:

receiving, from a compiler, a compiler-analysis artifact (CAA) generated by compiling a mainframe-source artifact (MSA);
generating, from the CAA, an abstract-syntax-tree (CAA-AST);
identifying, based on the CAA-AST, a plurality of logical segments of the MSA;
for each logical segment:
    determining a segment descriptor comprising a segment identifier and a segment label;
    generating a segment-code prompt based on the segment descriptor; and
    generating, by applying the segment-code prompt to a large-language model (LLM), segment code; and
integrating the segment code of the plurality of logical segments to form integrated project code for the MSA.

36. The method of embodiment 35, wherein the CAA comprises a SYSADATA file emitted by a mainframe COBOL compiler.

37. The method of any one of embodiments 35-36, wherein the segment-code prompt is generated from a prompt template selected from a template library based on the segment label and a target programming language.

38. The method of any one of embodiments 35-39, wherein the segment code comprises one or more Java classes that implement business logic extracted from the corresponding logical segment.

39. The method of any one of embodiments 35-36, wherein integrating the segment code further comprises deduplicating overlapping artifacts based on segment identifiers and emitting a consolidated project structure.

40. The method of any one of embodiments 35-39, further comprising generating segment documentation for the plurality of logical segments by:

generating a segment-documentation prompt for each logical segment;
applying the segment-documentation prompt to a second LLM to generate segment documentation; and
integrating the segment documentation into integrated project documentation for the MSA.

41. The method of any one of embodiments 35-40, wherein the segment code is generated by a code-generation engine implemented as a software agent.

42. A system comprising:

a processor; and
non-transitory computer readable storage medium comprising program instructions stored thereon that are executable by a processor to cause the following operations for generating segment-specific source code for a legacy mainframe-source artifact:
    receiving, from a compiler, a compiler-analysis artifact (CAA) generated by compiling a mainframe-source artifact (MSA);
    generating, from the CAA, an abstract-syntax-tree (CAA-AST);
    identifying, based on the CAA-AST, a plurality of logical segments of the MSA;
    for each logical segment:
        determining a segment descriptor comprising a segment identifier and a segment label;
        generating a segment-code prompt based on the segment descriptor; and
        generating, by applying the segment-code prompt to a large-language model (LLM), segment code; and
    integrating the segment code of the plurality of logical segments to form integrated project code for the MSA.

43. The system of embodiment 42, wherein the CAA comprises a SYSADATA file emitted by a mainframe COBOL compiler.

44. The system of any one of embodiments 42-43, wherein the segment-code prompt is generated from a prompt template selected from a template library based on the segment label and a target programming language.

45. The system of any one of embodiments 42-44, wherein the segment code comprises one or more Java classes that implement business logic extracted from the corresponding logical segment.

46. The system of any one of embodiments 42-45, wherein integrating the segment code further comprises deduplicating overlapping artifacts based on segment identifiers and emitting a consolidated project structure.

47. The system of any one of embodiments 42-46, the operations further comprising generating segment documentation for the plurality of logical segments by:

generating a segment-documentation prompt for each logical segment;
applying the segment-documentation prompt to a second LLM to generate segment documentation; and
integrating the segment documentation into integrated project documentation for the MSA.

48. The system of any one of embodiments 42-47, wherein the segment code is generated by a code-generation engine implemented as a software agent.

49. Non-transitory computer readable storage medium comprising program instructions stored thereon that are executable by a processor to cause the method operations of any one of embodiments 35-41.

50. A computer-implemented method for enabling retrieval-augmented interaction with integrated project documentation and code, the method comprising:

receiving segment documentation generated from logical segments of a mainframe-source artifact (MSA);

computing, for each segment of the segment documentation, a vector embedding based on a text encoder model;

storing the vector embeddings in a searchable index;

receiving a user query via a chat interface;

generating, based on the user query, a query vector;

retrieving, from the index, one or more documentation chunks whose vector embeddings are most similar to the query vector;

constructing, based on the retrieved documentation chunks, a prompt context comprising narrative content, associated segment identifiers, and referenced lines of project code;

generating, by applying the prompt context and user query to a large-language model (LLM), a response; and presenting the response via the chat interface.

51. The method of embodiment 50, wherein the segment documentation is generated based on segment-documentation prompts applied to an LLM, and the documentation includes input/output descriptions and control-flow explanations of the corresponding COBOL code segments.

52. The method of any one of embodiments 50-51, wherein the index is an approximate-nearest-neighbor (ANN) index and the vector embeddings are computed using a transformer-based encoder model.

53. The method of any one of embodiments 50-52, wherein the retrieved documentation chunks include provenance metadata linking each chunk to a segment identifier and a corresponding AST node.

54. The method of any one of embodiments 50-53, wherein the constructed prompt context further includes one or more lines of integrated project code referenced by the retrieved documentation chunks.

55. The method of any one of embodiments 50-54, wherein the chat interface is part of an interface engine comprising:

a document/code viewer operable to display code and documentation side-by-side; and a feedback engine operable to receive user feedback and trigger regeneration of one or more segments.

56. The method of any one of embodiments 50-55, wherein the chat interface is implemented by a chat engine that is or defines a chat agent operable to invoke LLM-based responses based on dynamically retrieved, vectorized documentation.

57. A system comprising:

a processor; and non-transitory computer readable storage medium comprising program instructions stored thereon that are executable by a processor to cause the following operations for enabling retrieval-augmented interaction with integrated project documentation and code:

receiving segment documentation generated from logical segments of a mainframe-source artifact (MSA);

computing, for each segment of the segment documentation, a vector embedding based on a text encoder model;

storing the vector embeddings in a searchable index;

receiving a user query via a chat interface;

generating, based on the user query, a query vector;

retrieving, from the index, one or more documentation chunks whose vector embeddings are most similar to the query vector;

constructing, based on the retrieved documentation chunks, a prompt context comprising narrative content, associated segment identifiers, and referenced lines of project code;

generating, by applying the prompt context and user query to a large-language model (LLM), a response; and presenting the response via the chat interface.

58. The system of embodiment 57, wherein the segment documentation is generated based on segment-documentation prompts applied to an LLM, and the documentation includes input/output descriptions and control-flow explanations of the corresponding COBOL code segments.

59. The system of any one of embodiments 57-58, wherein the index is an approximate-nearest-neighbor (ANN) index and the vector embeddings are computed using a transformer-based encoder model.

60. The system of any one of embodiments 57-59, wherein the retrieved documentation chunks include provenance metadata linking each chunk to a segment identifier and a corresponding AST node.

61. The system of any one of embodiments 57-60, wherein the constructed prompt context further includes one or more lines of integrated project code referenced by the retrieved documentation chunks.

62. The system of any one of embodiments 57-61, wherein the chat interface is part of an interface engine comprising:

a document/code viewer operable to display code and documentation side-by-side; and a feedback engine operable to receive user feedback and trigger regeneration of one or more segments.

63. The system of any one of embodiments 57-62, wherein the chat interface is implemented by a chat engine that is or defines a chat agent operable to invoke LLM-based responses based on dynamically retrieved, vectorized documentation.

64. Non-transitory computer readable storage medium comprising program instructions stored thereon that are executable by a processor to cause the method operations of any one of embodiments 50-56.

65. A computer-implemented method for migrating integrated project code generated from a mainframe-source artifact (MSA), the method comprising:

receiving integrated project code corresponding to a plurality of logical segments of the MSA;

accessing a migration policy defining deployment configurations for a target runtime environment;

applying the migration policy to transform the integrated project code into one or more deployment artifacts; and associating each deployment artifact with one or more segment identifiers corresponding to the logical segments from which the artifact was generated.

66. The method of embodiment 65, wherein the migration policy specifies one or more of:

(a) a containerization configuration;

(b) a serverless deployment template;

(c) a CI/CD pipeline; or (d) an infrastructure-as-code template.

67. The method of any one of embodiments 65-66, wherein applying the migration policy comprises generating:

(a) a Dockerfile;

(b) a Kubernetes Helm chart;

(c) a GitHub Actions workflow; or (d) a Terraform or CloudFormation template.

68. The method of any one of embodiments 65-67, wherein the migration policy is retrieved from a migration-policy store and includes versioned YAML or JSON configuration files referenced by a policy identifier.

69. The method of any one of embodiments 65-68, wherein associating the deployment artifact with one or more segment identifiers comprises recording a provenance mapping linking the deployment artifact to the corresponding logical segments, to preserve traceability post-deployment.

70. The method of any one of embodiments 65-69, wherein the integrated project code is produced by compiling a legacy COBOL program into a compiler-analysis artifact, generating an abstract-syntax tree, segmenting the tree, generating segment-code prompts, and applying the prompts to a large language model to generate the segment code.

71. The method of any one of embodiments 65-70, wherein the migration is performed by a code-migration engine implemented as or defining a software agent that autonomously applies deployment rules to integrated project code and outputs a deployment bundle.

72. A system comprising:

a processor; and non-transitory computer readable storage medium comprising program instructions stored thereon that are executable by a processor to cause the following operations for migrating integrated project code generated from a mainframe-source artifact (MSA):

receiving integrated project code corresponding to a plurality of logical segments of the MSA;

accessing a migration policy defining deployment configurations for a target runtime environment;

applying the migration policy to transform the integrated project code into one or more deployment artifacts; and associating each deployment artifact with one or more segment identifiers corresponding to the logical segments from which the artifact was generated.

73. The system of embodiment 72, wherein the migration policy specifies one or more of:

(a) a containerization configuration;

(b) a serverless deployment template;

(c) a CI/CD pipeline; or (d) an infrastructure-as-code template.

74. The system of any one of embodiments 72-73, wherein applying the migration policy comprises generating:

(a) a Dockerfile;

(b) a Kubernetes Helm chart;

(c) a GitHub Actions workflow; or (d) a Terraform or CloudFormation template.

75. The system of any one of embodiments 72-74, wherein the migration policy is retrieved from a migration-policy store and includes versioned YAML or JSON configuration files referenced by a policy identifier.

76. The system of any one of embodiments 72-75, wherein associating the deployment artifact with one or more segment identifiers comprises recording a provenance mapping linking the deployment artifact to the corresponding logical segments, to preserve traceability post-deployment.

77. The system of any one of embodiments 72-76, wherein the integrated project code is produced by compiling a legacy COBOL program into a compiler-analysis artifact, generating an abstract-syntax tree, segmenting the tree, generating segment-code prompts, and applying the prompts to a large language model to generate the segment code.

78. The system of any one of embodiments 72-77, wherein the migration is performed by a code-migration engine implemented as or defining a software agent that autonomously applies deployment rules to integrated project code and outputs a deployment bundle.

79. Non-transitory computer readable storage medium comprising program instructions stored thereon that are executable by a processor to cause the method operations of any one of embodiments 65-71.

What is claimed is:

1. A computer-implemented method for transforming a mainframe-source artifact into integrated project code and corresponding project documentation, the method comprising:

compiling, with a mainframe compiler, a mainframe-source artifact (MSA) to generate a compiler-analysis artifact (CAA);

generating, from the CAA, an abstract-syntax-tree (CAA-AST);

identifying, based on the CAA-AST, a plurality of logical code segments of the MSA;

for each logical code segment:

determining a segment descriptor comprising a segment identifier and a segment label;

generating a segment-prompt package comprising a segment-documentation prompt and a segment-code prompt;

generating, by applying the segment-documentation prompt to a first large-language model (LLM), segment documentation; and generating, by applying the segment-code prompt to a second LLM, segment code;

integrating the segment documentation of the plurality of logical code segments to form integrated project documentation for the MSA;

integrating the segment code of the plurality of logical code segments to form integrated project code for the MSA; and presenting, via a user-interface engine, the integrated project documentation and the integrated project code, wherein identifying the plurality of logical code segments comprises traversing dependency links in the CAA-AST until a dependency-closure condition is met to ensure that each logical code segment contains every data structure and external operation referenced by that segment.

2. The method of claim 1, wherein the CAA comprises a compiler-generated binary file emitted by the mainframe compiler.

3. The method of claim 1, wherein the CAA comprises a compiler-generated binary file that encodes a parse-tree representation of the mainframe-source artifact and symbol-table metadata to map each node of the parse-tree to a corresponding data definition or procedure element.

4. The method of claim 1, wherein the CAA-AST comprises a hierarchical graph data structure whose nodes represent compiler-resolved program elements and whose edges encode control-flow and data-reference relationships among those nodes.

5. The method of claim 1, wherein:

the segment identifier is a deterministic hash calculated from node identifiers included in the logical code segment; and the segment label is selected from a predefined segment-label library that includes at least: Data-Structure Definition, Persistent-Storage Definition, Relational-Query Operation, Transactional-API Call, and Control-Flow Logic.

6. The method of claim 1, wherein generating the segment-prompt package further comprises deriving at least one of the segment-documentation prompt or the segment-code prompt from a prompt template stored in a template library and selected according to the segment label.

7. The method of claim 1, wherein selecting the first LLM comprises selecting, from a model library, a model corresponding to a target user role for the documentation, or selecting the second LLM comprises selecting, from the model library, a model having a code-generation capability corresponding to a target programming language of the segment code.

8. The method of claim 1, wherein the user-interface engine comprises:

a chat interface operable to receive natural-language queries and regeneration commands; and a viewer operable to display the integrated project documentation and the integrated project code in a coordinated presentation.

9. A system comprising:

a processor; and non-transitory computer readable storage medium comprising program instructions stored thereon that are executable by a processor to cause the following operations for transforming a mainframe-source artifact into integrated project code and corresponding project documentation:

compiling, with a mainframe compiler, a mainframe-source artifact (MSA) to generate a compiler-analysis artifact (CAA);

generating, from the CAA, an abstract-syntax-tree (CAA-AST);

identifying, based on the CAA-AST, a plurality of logical code segments of the MSA;

for each logical code segment:

determining a segment descriptor comprising a segment identifier and a segment label;

generating a segment-prompt package comprising a segment-documentation prompt and a segment-code prompt;

generating, by applying the segment-documentation prompt to a first large-language model (LLM), segment documentation; and generating, by applying the segment-code prompt to a second LLM, segment code;

integrating the segment documentation of the plurality of logical code segments to form integrated project documentation for the MSA;

integrating the segment code of the plurality of logical code segments to form integrated project code for the MSA; and presenting, via a user-interface engine, the integrated project documentation and the integrated project code, wherein identifying the plurality of logical code segments comprises traversing dependency links in the CAA-AST until a dependency-closure condition is met to ensure that each logical code segment contains every data structure and external operation referenced by that segment.

10. The system of claim 9, wherein the CAA comprises a compiler-generated binary file emitted by the mainframe compiler.

11. The system of claim 9, wherein the CAA comprises a compiler-generated binary file that encodes a parse-tree representation of the mainframe-source artifact and symbol-table metadata to map each node of the parse-tree to a corresponding data definition or procedure element.

12. The system of claim 9, wherein the CAA-AST comprises a hierarchical graph data structure whose nodes represent compiler-resolved program elements and whose edges encode control-flow and data-reference relationships among those nodes.

13. The system of claim 9, wherein:

the segment identifier is a deterministic hash calculated from node identifiers included in the logical code segment; and the segment label is selected from a predefined segment-label library that includes at least: Data-Structure Definition, Persistent-Storage Definition, Relational-Query Operation, Transactional-API Call, and Control-Flow Logic.

14. The system of claim 9, wherein generating the segment-prompt package further comprises deriving at least one of the segment-documentation prompt or the segment-code prompt from a prompt template stored in a template library and selected according to the segment label.

15. The system of claim 9, wherein selecting the first LLM comprises selecting, from a model library, a model corresponding to a target user role for the documentation, or selecting the second LLM comprises selecting, from the model library, a model having a code-generation capability corresponding to a target programming language of the segment code.

16. The system of claim 9, wherein the user-interface engine comprises:

a chat interface operable to receive natural-language queries and regeneration commands; and a viewer operable to display the integrated project documentation and the integrated project code in a coordinated presentation.

17. Non-transitory computer readable storage medium comprising program instructions stored thereon that are executable by a processor to cause the following operations for transforming a mainframe-source artifact into integrated project code and corresponding project documentation:

compiling, with a mainframe compiler, a mainframe-source artifact (MSA) to generate a compiler-analysis artifact (CAA);

generating, from the CAA, an abstract-syntax-tree (CAA-AST);

identifying, based on the CAA-AST, a plurality of logical code segments of the MSA;

for each logical code segment:

determining a segment descriptor comprising a segment identifier and a segment label;

generating a segment-prompt package comprising a segment-documentation prompt and a segment-code prompt;

generating, by applying the segment-documentation prompt to a first large-language model (LLM), segment documentation; and generating, by applying the segment-code prompt to a second LLM, segment code;

integrating the segment documentation of the plurality of logical code segments to form integrated project documentation for the MSA;

integrating the segment code of the plurality of logical code segments to form integrated project code for the MSA; and presenting, via a user-interface engine, the integrated project documentation and the integrated project code, wherein identifying the plurality of logical code segments comprises traversing dependency links in the CAA-AST until a dependency-closure condition is met to ensure that each logical code segment contains every data structure and external operation referenced by that segment.

18. The medium of claim 17, wherein the CAA comprises a compiler-generated binary file emitted by the mainframe compiler.

* * * * *